US 8,942,282 B2

(12) United States Patent
Karczewicz et al.

(10) Patent No.: US 8,942,282 B2
(45) Date of Patent: Jan. 27, 2015

(54) VARIABLE LENGTH CODING OF CODED BLOCK PATTERN (CBP) IN VIDEO COMPRESSION

(75) Inventors: Marta Karczewicz, San Diego, CA (US); Wei-Jung Chien, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 13/084,494

(22) Filed: Apr. 11, 2011

(65) Prior Publication Data

US 2011/0249721 A1 Oct. 13, 2011

Related U.S. Application Data

(60) Provisional application No. 61/323,256, filed on Apr. 12, 2010, provisional application No. 61/386,460, filed on Sep. 24, 2010, provisional application No. 61/323,731, filed on Apr. 13, 2010, provisional application No. 61/364,749, filed on Jul. 15, 2010.

(51) Int. Cl.
*H04N 7/12* (2006.01)
*H04N 11/02* (2006.01)
(Continued)

(52) U.S. Cl.
CPC ... *H04N 19/00133* (2013.01); *H04N 19/00551* (2013.01); *H04N 19/00315* (2013.01); *H04N 19/00369* (2013.01); *H04N 19/00278* (2013.01);
(Continued)

(58) Field of Classification Search
USPC .......................................................... 375/240
See application file for complete search history.

(56) References Cited

U.S. PATENT DOCUMENTS 6,944,351 B2 * 9/2005 Kim et al. .................. 382/246
7,249,311 B2 * 7/2007 Lamy ........................ 714/796
(Continued)

FOREIGN PATENT DOCUMENTS

EP  1478190 A1  11/2004
JP  3944225 B2   7/2007
(Continued)

OTHER PUBLICATIONS

Qualcomm Inc, Video Coding Using Extended Block Sizes ITU (International Telecommunication Union) Study Group 16, vol. COM 16-C 123-E, (Jan. 1, 2009), p. 4pp, XP007912516.
(Continued)

*Primary Examiner* — Seth V Perungavoor
*Assistant Examiner* — Talha Nawaz
(74) *Attorney, Agent, or Firm* — Todd E. Marlette

(57) ABSTRACT

This disclosure describes techniques for coding video data. As one example, this disclosure describes a coded block pattern (CBP) for a coding unit (CU) of video data that indicates whether or not each of a luminance component (Y), a first chrominance component (U), and a second chrominance component (V) include at least one non-zero coefficient. According to another example, this disclosure describes a CBP that indicates whether respective blocks of a CU include at least on non-zero coefficient. The CBP described herein may be mapped to a single variable length code (VLC) code word. The VLC code word may be used by a coder to code the CU of video data.

18 Claims, 12 Drawing Sheets

(51) Int. Cl.

| | |
|---|---|
| *H04N 11/04* | (2006.01) |
| *H04N 19/134* | (2014.01) |
| *H04N 19/463* | (2014.01) |
| *H04N 19/186* | (2014.01) |
| *H04N 19/196* | (2014.01) |
| *H04N 19/176* | (2014.01) |
| *H04N 19/159* | (2014.01) |
| *H04N 19/13* | (2014.01) |

(52) U.S. Cl.
CPC ... *H04N 19/00218* (2013.01); *H04N 19/00121* (2013.01)
USPC .............. 375/240.02; 375/240; 375/240.01; 375/240.25; 345/629; 348/448

(56) References Cited

U.S. PATENT DOCUMENTS

| | | | | |
|---|---|---|---|---|
| 7,317,839 | B2* | 1/2008 | Holcomb | 382/236 |
| 7,599,438 | B2* | 10/2009 | Holcomb et al. | 375/240.23 |
| 7,664,176 | B2* | 2/2010 | Bao et al. | 375/240.08 |
| 8,335,261 | B2* | 12/2012 | Karczewicz et al. | 375/240.23 |
| 2004/0234144 | A1 | 11/2004 | Sugimoto et al. | |
| 2005/0013496 | A1* | 1/2005 | Bruls et al. | 382/239 |
| 2005/0249291 | A1* | 11/2005 | Gordon et al. | 375/240.18 |
| 2010/0086029 | A1 | 4/2010 | Chen et al. | |
| 2010/0086032 | A1 | 4/2010 | Chen et al. | |
| 2010/0086049 | A1 | 4/2010 | Ye et al. | |
| 2011/0200114 | A1* | 8/2011 | Schwartz | 375/240.18 |

FOREIGN PATENT DOCUMENTS

| | | | |
|---|---|---|---|
| WO | 0033583 | A1 | 6/2000 |
| WO | 2010039729 | A2 | 4/2010 |

OTHER PUBLICATIONS

U.S. Appl. No. 13/084,473, filed Apr. 11, 2011, "Variable Length Coding of Coded Block Pattern (CBP) in Video Compression", pp. 1-36.

Karczewicz, M., et al., "Video Coding Technology Proposal by Qualcomm Inc.", Joint Collaborative Team on Video Coding (JCT-VC) of ITU-T SG16 WP3 and ISO/IEC JTC1/SC29/WG11, Document: JCTVC-A121, Status: Input Document to JCT-VC, Apr. 2010, pp. 1-24.

Lim (SK Telecom) J., et al., "Video coding technology proposal by SK telecom, Sejong University and Sungkyunkwan University", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16); URL: http://wftp3.itu.int/av-arch/jctvc-site/, No. XP030007550, Apr. 13, 2010, XP030007551, ISSN: 0000-0049 abstract section 2.2 table 2.

Wien, M., "Adaptive Block Transforms (ABT)" Joint Video Team (JVT) of ISO/IEC MPEG & ITU-T VCEG(ISO/IEC JTC1/SC29/WG11 and ITU-T SG16 Q6), No. VCEG-M62, Mar. 28, 2001, XP030003232 pp. 1-2.

Bj0ntegaard, G., et al., "H.26L Test Model Long Term No. 4 (TML-4)", ITU Study Group 16—Video Coding Experts Group—ISO/IEC MPEG & ITU-T VCEG(IS0/IECJTC1/SC29/WG11 and ITU-T SG16 Q6), No. ql5j72d0, Jun. 16, 2000), XP030003092.

"H.261, Video Codec for Audiovisual Services AT p x 64 kbit/s", 1.3.1993, No. H.261, Mar. 1, 1993, XP030001504, ISSN: 0000-0511.

International Search Report and Written Opinion—PCT/US2011/032194—ISA/EPO—Oct. 2, 2010.

Lainema, J., et al., "A Response to N3318: Nokia MVC Decoder Description", 53. MPEG Meeting; Jul. 17, 2000-Jul. 21, 2000; Beijing; (Motion Pictureexpert Group or ISO/1 EC JTC1/SC29/WG11), No. M6179, Jul. 10, 2000, XP030035345, ISSN: 0000-0292 section 4.8 table 4.5.

Rijkse, K., et al., "Draft Recommendation H.26P", 8. LBC Meeting; Sep. 1, 1995-Dec. 1, 1995; Leidschendamm; (ITU Low Bitratecoding Group), No. LBC-95-027R1, Jan. 9, 1995, XP030028371, ISSN: 0000-0119.

Study Group 16 Chair (on Behalf of SMPTE): "Addendum 1: Proposed SMPTE Standard for Television: VC-9 Compressed Video Bitstream Format and Decoding Process (Draft Oct. 7, 2003; C24. 008-2843B/WD3); TD 62 Add.1", ITU-T Draft Study Period 2001-2004, International Telecommunication Union, Geneva; CH, vol. Study Group 16, Jan. 20, 2004, pp. 1-420, XP017430366.

* cited by examiner

VARIABLE LENGTH CODING OF CODED BLOCK PATTERN (CBP) IN VIDEO COMPRESSION

This application claims the benefit of U.S. Provisional Application No. 61/323,256 titled "Variable Length Coding for Coded Block Pattern (CBP)" filed Apr. 12, 2010, U.S. Provisional Application No. 61/386,460 titled "Variable Length Coding for Coded Block Pattern (CBP) in Video Compression" filed Sep. 24, 2010, U.S. Provisional Application No. 61/323,731 titled "Variable Length Code for Block Type and Coded Block Flag In Video Coding" filed Apr. 13, 2010, and U.S. Provisional Application No. 61/364,749 titled "Variable Length Coding for Coded Block Flag" filed Jul. 15, 2010, the entire contents of each of which are incorporated herein by reference.

TECHNICAL FIELD

This disclosure relates to block-based video coding techniques used to compress video data and, more particularly, the coding of syntax elements referred to as coded block patterns (CBPs).

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, tablet computers, digital cameras, digital recording devices, video gaming devices, video game consoles, personal multimedia players, and the like. Such video devices may implement video compression techniques, such as those described in MPEG-2, MPEG-4, or ITU-T H.264/MPEG-4, Part 10, Advanced Video Coding (AVC), in order compress video data. Video compression techniques perform spatial and temporal prediction to reduce or remove redundancy inherent in video sequences. New standards, such as the High Efficiency Video Coding (HEVC) standard continue to emerge and evolve.

Many video coding standards and techniques use block-based video coding. Block-based video coding techniques divide the video data of a video frame (or portion thereof) into video blocks and then encode the video blocks using block-based compression techniques. The video blocks are encoded using one or more video-specific encoding techniques as well as general data compression techniques. Video encoding often includes motion estimation, motion compensation, transform (e.g., discrete cosine transforms (DCT)), quantization, and variable length coding.

In the ITU-T H.264 standard, the transforms are defined as 8 by 8 transforms. A 16 by 16 "macroblock" comprises four 8 by 8 luma blocks and two sub-sampled 8 by 8 chroma blocks. Each of these luma and chroma blocks is predictively coded to generate a residual block, which is transformed via the 8 by 8 transform into a block of transform coefficients. A so-called "coded block pattern (CBP)" is often included as syntax information, e.g., in a macroblock header of an H.264-complient bitstream, in order to signal whether each individual 8 by 8 residual block of transform coefficients has any non-zero data. If the CBP indicates that a given 8 by 8 residual block of transform coefficients does not have any non-zero data, then no coefficient data is communicated for that block. The use of 6-bit CBPs conventionally adds a number of bits of overhead to the macroblock header. However, CBPs also facilitate data compression because blocks of transform coefficients often do not include any non-zero data.

SUMMARY

This disclosure describes video coding techniques applicable to a coded block pattern (CBP) of a coding unit (CU). The CBP may comprise video block syntax information, e.g., in a header of an encoded bitstream. The techniques of this disclosure apply variable length coding (VLC) techniques to the CBP, and may select one or more VLC tables for coding the CBP. According to one aspect of this disclosure, techniques are provided for signaling, as a single VLC code word, a CBP that include a coded block flag (CBF) for each of respective luma (Y) first chroma (U), and second chroma (V) blocks of a coding unit (CU). According to another aspect of this disclosure, techniques are described for signaling a CBP that includes a plurality of CBF for sub-blocks (e.g., transform unit (TU) and/or prediction units (PU)) of a CU grouped together as a single VLC code word. These and other techniques described herein may be used to improve efficiency in coding (e.g., encoding or decoding) video data.

For example, a method of encoding a coding unit (CU) of video data is described herein. The method includes receiving a CU of video data that includes a luminance component (Y), a first chrominance component (U), and a second chrominance component (V). The method further includes determining whether or not each of the luminance component (Y), the first chrominance component (U), and the second chrominance component (V) include at least one non-zero coefficient. The method further includes generating a coded block pattern (CBP) for the CU that collectively indicates whether or not each of the luminance component (Y), the first chrominance component (U), and the second chrominance component (V) include at least one non-zero coefficient. The method further includes mapping the generated CBP to a single variable length code (VLC) code word. The method further includes outputting the single VLC code word.

According to another example, an apparatus that encodes video data is described herein. The apparatus includes a video encoder that receives a CU of video data that includes a luminance component (Y), a first chrominance component (U), and a second chrominance component (V) and determines whether or not each of the luminance component (Y), the first chrominance component (U), and the second chrominance component (V) include at least one non-zero coefficient. The apparatus further includes a CBP module that generates a coded block pattern (CBP) for the CU that collectively indicates whether or not each of the luminance component (Y), the first chrominance component (U), and the second chrominance component (V) include at least one non-zero coefficient, maps the generated CBP to a single variable length code (VLC) code word, and outputs the single VLC code word.

According to another example, a device that encodes video data is described herein. The device includes means for encoding video data that receive a coding unit (CU) of video data that includes a luminance component (Y), a first chrominance component (U), and a second chrominance component (V). The device further includes means for determining whether or not each of the luminance component (Y), the first chrominance component (U), and the second chrominance component (V) include at least one non-zero coefficient. The device further includes means for generating a coded block pattern (CBP) for the CU that collectively indicates whether or not each of the luminance component (Y), the first chrominance component (U), and the second chrominance component (V) include at least one non-zero coefficient. The device further includes means for mapping the generated CBP to a single variable length code (VLC) code word. The device further includes means for outputting the single VLC code word.

According to another example, a computer-readable storage medium is described herein. The computer-readable storage medium includes instructions that upon execution in a processor, cause the processor to encode video data. The instructions cause the processor to receive a CU of video data that includes a luminance component (Y), a first chrominance component (U), and a second chrominance component (V). The instructions further cause the processor to determine whether or not each of the luminance component (Y), the first chrominance component (U), and the second chrominance component (V) include at least one non-zero coefficient. The instructions further cause the processor to generate a coded block pattern (CBP) for the CU that collectively indicates whether or not each of the luminance component (Y), the first chrominance component (U), and the second chrominance component (V) include at least one non-zero coefficient. The instructions further cause the processor to map the generated CBP to a single variable length code (VLC) code word. The instructions further cause the processor to output the single VLC code word.

According to another example, a method of decoding a CU of video data is described herein. The method includes receiving a single variable length code (VLC) code word for a CU of video data that includes a luma component (Y), a first chroma component (U), and a second chroma component (V). The further method includes determining, based on the single VLC code word, a coded block pattern (CBP) for the CU, wherein the CBP indicates individually whether or not each of the luma component (Y), the first chroma component (U), and the second chroma component (V) include a non-zero coefficient. The further method includes using the determined CBP to decode the CU.

According to another example, an apparatus that decodes video data is described herein. The apparatus includes a video decoder that receives a single variable length code (VLC) code word for a CU of video data that includes a luma component (Y), a first chroma component (U), and a second chroma component (V). The apparatus further includes a CBP decoding module that determines, based on the single VLC code word, a coded block pattern (CBP) for the CU, wherein the CBP indicates individually whether or not each of the luma component (Y), the first chroma component (U), and the second chroma component (V) include a non-zero coefficient. The video decoder further uses the determined CBP to decode the CU.

According to another example, a device that decodes video data is described herein. The device includes means for receiving a single variable length code (VLC) code word for a CU of video data that includes a luma component (Y), a first chroma component (U), and a second chroma component (V). The device further includes means for determining, based on the single VLC code word, a coded block pattern (CBP) for the CU, wherein the CBP indicates individually whether or not each of the luma component (Y), the first chroma component (U), and the second chroma component (V) include a non-zero coefficient. The device further includes means for using the determined CBP to decode the CU.

According to another example, a computer-readable storage medium is described herein. The computer-readable storage medium includes instructions that upon execution in a processor, cause the processor to decode video data. The instructions cause the processor to receive a single variable length code (VLC) code word for a CU of video data that includes a luma component (Y), a first chroma component (U), and a second chroma component (V). The instructions further cause the processor to determine, based on the single VLC code word, a coded block pattern (CBP) for the CU, wherein the CBP indicates individually whether or not each of the luma component (Y), the first chroma component (U), and the second chroma component (V) include a non-zero coefficient. The instructions further cause the processor to use the determined CBP to decode the CU.

According to another example, a method of encoding a coding unit (CU) of video data is described herein. The method includes receiving a CU of video data that includes a plurality of blocks. The method further includes determining whether or not each of the plurality of blocks include at least one non-zero coefficient. The method further includes generating a coded block flag (CBF) for each of the plurality of blocks that indicates whether the respective block includes at least one non-zero coefficient. The method further includes generating a coded block pattern (CBP) for the CU that collectively indicates the CBF for each of the plurality of blocks. The method further includes mapping the generated CBP to a single variable length code (VLC) code word. The method further includes outputting the single VLC code word.

According to another example, an apparatus that encodes video data is described herein. The apparatus includes a video encoder that receives a CU of video data that includes a plurality of blocks and determines whether or not each of the plurality of blocks include at least one non-zero coefficient. The apparatus further includes a CBP module configured to generate a coded block flag (CBF) for each of the plurality of blocks that indicates whether the respective block includes at least one non-zero coefficient. The CBP module is further configured to generate a coded block pattern (CBP) for the CU that collectively indicates the CBF for each of the plurality of blocks. The CBP module is further configured to map the generated CBP to a single variable length code (VLC) code word. The CBP module is further configured to output the single VLC code word.

According to another example, an apparatus for encoding video data is described herein. The apparatus includes means for receiving a CU of video data that includes a plurality of blocks. The apparatus further includes means for determining whether or not each of the plurality of blocks include at least one non-zero coefficient. The apparatus further includes means for generating a coded block flag (CBF) for each of the plurality of blocks that indicates whether the respective block includes at least one non-zero coefficient. The apparatus further includes means for generating a coded block pattern (CBP) for the CU that collectively indicates the CBF for each of the plurality of blocks. The apparatus further includes means for mapping the generated CBP to a single variable length code (VLC) code word. The apparatus further includes means for outputting the single VLC code word.

According to another example, a computer-readable storage medium is described herein. The computer-readable storage medium includes instructions configured to cause a computing device to receive a CU of video data that includes a plurality of blocks. The instructions further cause the computing device to determine whether or not each of the plurality of blocks include at least one non-zero coefficient. The instructions further cause the computing device to generate a coded block flag (CBF) for each of the plurality of blocks that indicates whether the respective block includes at least one non-zero coefficient. The instructions further cause the computing device to generate a coded block pattern (CBP) for the CU that collectively indicates the CBF for each of the plurality of blocks. The instructions further cause the computing device to map the generated CBP to a single variable length code (VLC) code word. The instructions further cause the computing device to outputting the single VLC code word.

According to another example, a method of decoding a coding unit (CU) of video data is described herein. The method includes receiving a single variable length code (VLC) code word for a CU of video data that includes a plurality of blocks. The method further includes determining, based on the single VLC code word, a coded block pattern for the CU. The method further includes determining, based on the coded block pattern for the CU, a coded block flag (CBF) for each of the plurality of blocks, wherein the CBF indicates whether or not the respective block of the plurality of blocks includes at least one non-zero coefficient. The method further includes decoding the CU based on the determined CBF.

According to another example, an apparatus for decoding video data is described herein. The apparatus includes a video decoder configured to receive a single variable length code (VLC) code word for a CU of video data that includes a plurality of blocks, determine, based on the single VLC code word, a coded block pattern for the CU, determine, based on the coded block pattern for the CU, a coded block flag (CBF) for each of the plurality of blocks, wherein the CBF indicates whether or not the respective block of the plurality of blocks includes at least one non-zero coefficient, and decode the CU based on the determined CBF.

According to another example, an apparatus for decoding video data is described herein. The apparatus includes means for receiving a single variable length code (VLC) code word for a CU of video data that includes a plurality of blocks. The apparatus further includes means for determining, based on the single VLC code word, a coded block pattern for the CU. The apparatus further includes means for determining, based on the coded block pattern for the CU, a coded block flag (CBF) for each of the plurality of blocks, wherein the CBF indicates whether or not the respective block of the plurality of blocks includes at least one non-zero coefficient. The apparatus further includes means for decoding the CU based on the determined CBF.

According to another example, a computer-readable storage medium is described herein. The computer-readable storage medium includes instructions that cause a computing device to receive a single variable length code (VLC) code word for a CU of video data that includes a plurality of blocks. The instructions further cause the computing device to determine, based on the single VLC code word, a coded block pattern for the CU. The instructions further cause the computing device to determine, based on the coded block pattern for the CU, a coded block flag (CBF) for each of the plurality of blocks, wherein the CBF indicates whether or not the respective block of the plurality of blocks includes at least one non-zero coefficient. The instructions further cause the computing device to decode the CU based on the determined CBF.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
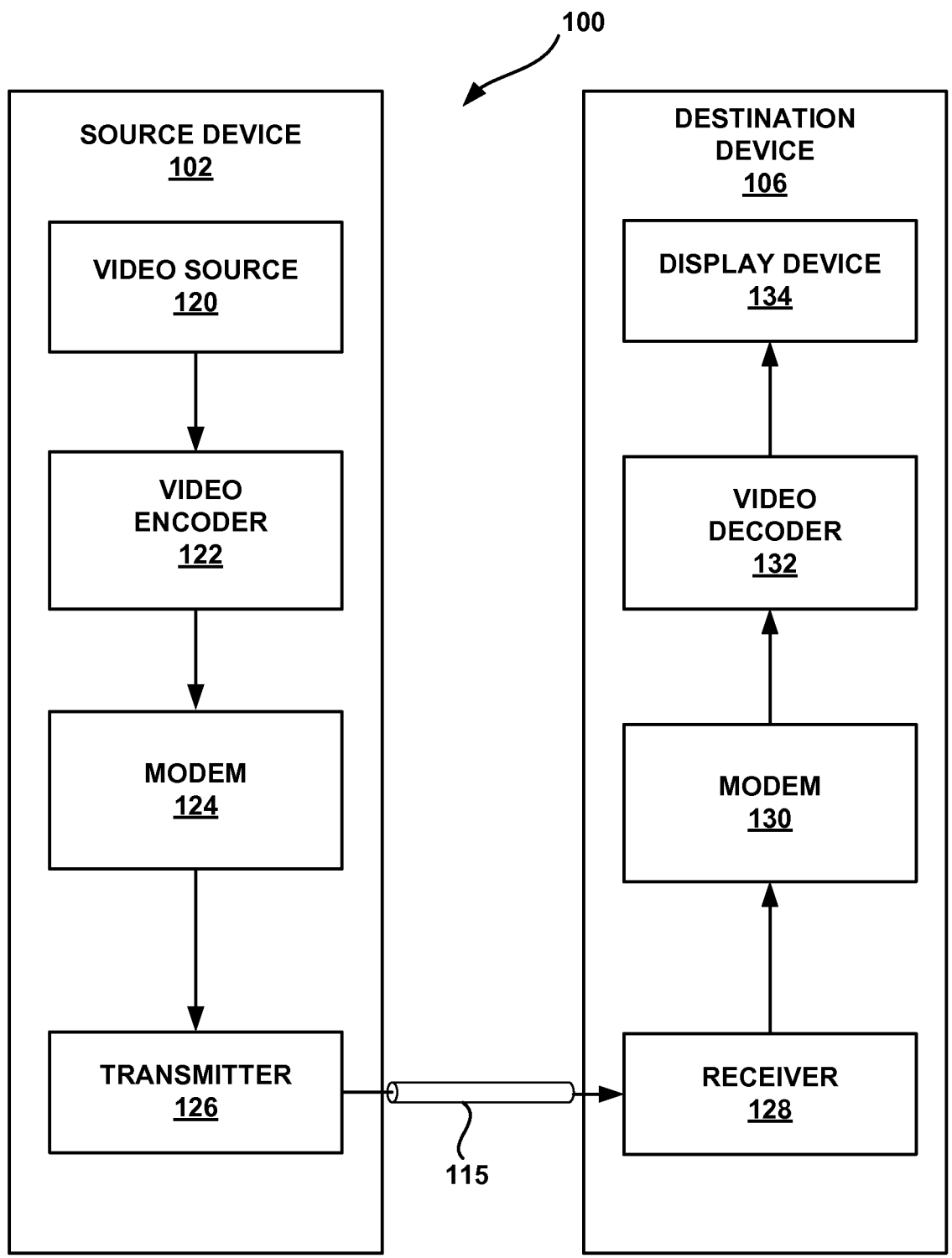
FIG. 1 is a block diagram illustrating a video encoding and decoding system that may implement one or more of the techniques of this disclosure.

This disclosure describes video coding techniques applicable to a coded block pattern (CBP) of a coding unit (CU) of video data, which is described in further detail below. According to one aspect of this disclosure, techniques are provided for signaling, as a single VLC code word, CBP that includes a coded block flag (CBF) for each of respective luma (Y) blocks, first chroma block (U), and second chroma block (V) blocks of a coding unit (CU). According to another aspect of this disclosure, techniques are provided for signaling, as a single VLC code word, a CBP for a plurality of blocks of a CU grouped together as a single VLC code word. These and other techniques described herein may be used to improve efficiency in coding (e.g., encoding or decoding) video data.

Efforts are currently in progress to develop a new video coding standard, currently referred to as High Efficiency Video Coding (HEVC). The emerging HEVC standard may sometimes be referred to as ITU-T H.265. The standardization efforts are based on a model of a video coding device referred to as the HEVC Test Model (HM). The HM presumes several capabilities of video coding devices over devices according to, e.g., ITU-T H.264/AVC. For example, whereas ITU-T H.264 provides nine intra-prediction modes, HM provides as many as thirty-four intra-prediction modes.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have the same size limitations associated with macroblocks. For example, a CU may be split into sub-CUs, and the size of the LCU may be different depending on the scenario or situation. In general, references in this disclosure to a CU may refer to a LCU of a picture or a sub-CU of an LCU. A LCU may be split into sub-CUs, and each sub-CU may be split into sub-CUs. Syntax data for a bitstream may define the size of the LCU as well as a maximum number of times an LCU may be split, referred to as maximum CU depth. Accordingly, a bitstream may also define a smallest coding unit (SCU). This disclosure also uses the term "block" to refer to any of an LCU, SCU, CU, prediction unit (PU), or transform unit (TU) (PU and TU are described in further detail below).

A LCU may be associated with a quadtree data structure. In general, a quadtree data structure includes one node per CU, where a root node corresponds to the LCU. If a CU is split into four sub-CUs, the node corresponding to the CU includes four child nodes, each of which corresponds to one of the sub-CUs or one or more sub-CUs of a sub-CU. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. Additional syntax elements may also be included for each CU, such as flags indicating whether filtering should be applied to the CU.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is intra-prediction mode encoded, or inter-prediction mode encoded.

A CU may also include one or more transform units (TUs) that may be used to perform transform operations on video data. Following prediction using a PU, a video encoder may calculate residual values for the portion of the CU corresponding to the PU. The residual values may be transformed, scanned, and quantized. A TU is not necessarily limited to the size of a PU. Thus, TUs may be larger or smaller than corresponding PUs for the same CU. In some examples, the maximum size of a TU may correspond to the size of the corresponding CU.

A CU may be represented by a luminance (luma) block (referred to as "Y), and two chrominance (chroma) blocks (referred to as "U" and "V," respectively). The luma blocks and chroma blocks may comprise residual blocks of data generated by predictably coding original values for the luma blocks and chroma blocks. The chroma blocks are typically sub-sampled because human vision is less sensitive to image properties represented by chrominance values. Each of the blocks may be predictively encoded based on blocks of previously coded pixels, which could be from a current, previous, or subsequent frame within a video sequence. Residual data associated with each of the blocks may be transformed to a frequency domain as part of the coding process. In some examples, a size (in terms of a number of samples) of chroma blocks (U and V) may be the same as or different from a size of a luma (Y) block, depending on whether subsampling is performed on chroma blocks.

A CBP may refer to a type of video block syntax information, e.g., which may be included in a CU header of an encoded bitstream. In H.264, CBPs typically include 6-bit information for a 16 by 16 CU (macroblock). In this case, the CU (macroblock) may include four 8 by 8 luma blocks of transform coefficients that collectively define the 16 by 16 pixel area, and two sub-sampled chroma blocks of transform coefficients that are sub-sampled over the 16 by 16 pixel area. Each bit in the CBP may indicate whether a given one of the chroma or luma blocks (i.e., the residual chroma or luma blocks) has non-zero transform coefficients. Bits of a CBP as described may be referred to as coded block flag (CBF). Each CBF is a flag that indicates whether one or more video components of a corresponding block contains non-zero transform coefficients. CBP generally refers to a number of CBFs that are signaled together as one syntax element.

According to one aspect, the techniques of this disclosure may address coding techniques that allow for the signaling of a CBP for a CU of video data that includes a plurality of CBF that indicate of whether each of respective Y, U, and V components of the CU include non-zero coefficients. For example, a first CBF of the CBP may indicate whether or not the U component of the CU includes non-zero data. A second CBF of the CBP may indicate whether or not the V component of the CU includes non-zero data. A third CBF of the CBP may indicate whether or not the Y component of the CU includes non-zero data. The CBP for the CU of video data may comprise a single VLC code word that indicates whether or not each of the respective Y, U, and V components include non-zero data. Such a VLC code word may represent an entry among a plurality of entries of a VLC table.

In some examples, the techniques of this disclosure may be used to create and/or select from among one or more VLC tables that include a plurality of VLC code words that each signal possible CPB as described above. The techniques described herein may be advantageous, because signaling a CBP that includes CBF for each of the luma (Y) and chroma (U and V) blocks of a CU as a single VLC code word may reduce an amount of data signaled for coding operations.

As described above, a CU may be broken into blocks, e.g., sub-CU and/or one or more PU or TU. According to another aspect, this disclosure describes techniques for signaling a CBP that includes respective CBF for each of a plurality of blocks (e.g., PU, TU) of a CU as a group using a single VLC code word. These techniques may be used to reduce an amount of data signaled for coding purposes and/or improve coding efficiency.

The techniques of this disclosure may address coding techniques that allow for different transform sizes. As set forth above, in some examples a CU may be split into smaller blocks for transform operations (e.g., TU as described above) or prediction operations (e.g., PU), as described above.

In some examples, a video encoder may signal a transform index for a CU. A transform index may indicate a size of the CU and/or a size of blocks (e.g., respective Y, U, V components), of the CU) such that a coder may determine a transform block size that corresponds to a size of the CU or block. In some examples, a transform index may be shared among different video components, e.g. Y, U and V, of a CU. In other examples, a transform index may be signaled for the respective luminance (Y) and chrominance (U and V) components of a CU individually.

According to another aspect of this disclosure, one or more transform indexes, as described above, may or may not be signaled based on a CBP value for a CU or block. For example, a coder may not signal a transform index for respective blocks of a CU (e.g., respective Y, U, and V components) if the CU only includes zero value coefficients.

A video coder may code a CU in "intra mode" (I-mode), or in "inter mode" (P-mode or B-mode). An intra mode encoded CU may rely on data of the same frame (e.g., other blocks of the same frame) of a video sequence. An inter mode encoded CU or block may rely on data of another frame of the video sequence.

In some examples, in addition to transform operations as described above, prediction operations may be performed using a PU based on a block size of PU. In some examples, a coder may signal a prediction mode for a PU. The prediction mode may identify a size and/or a type of prediction to be applied to the PU. For example, a prediction mode may indicate that a block is intra-16×16, which may indicate that the block is coded using intra-prediction (e.g., I-mode), and that the block has a size of 16×16. As another example, a prediction mode may indicate that a block is inter-8×8, which may indicate that the block is coded using inter-prediction (e.g., P-mode or B-mode), and that the block has a size of 8×8.

In some examples, a prediction mode as described above may be signaled using VLC techniques. For example, a particular prediction mode may be mapped to a code number, which is an index value that may be entered into a VLC table to locate a VLC code word. In some examples, a plurality of such code numbers may together comprise a mapping table that defines a mapping between different prediction mode values and different VLC code words. Such a mapping table may be constructed such that a most probable prediction mode is assigned an index for a shortest VLC code word. Accordingly, an amount of data to communicate prediction modes for a plurality of blocks may be minimized.

In some examples, a VLC mapping table may be adaptively adjusted. For example, as blocks of a video frame are encoded, an encoder may adapt code words of one or more VLC tables representing prediction modes based on a frequency of occurrence of each prediction mode. For example, if a prediction mode is determined to occur more frequently than other prediction modes for previously coded CUs or blocks, that prediction mode may be assigned a shorter VLC code word than other prediction modes.

According to another aspect of this disclosure, for coding an inter-coded frame, e.g. a B or P frame, a coder may assign dedicated code words to one or more intra-coded prediction modes in such a frame. The coder may adaptively assign VLC code words that correspond to inter-coded or other prediction modes, but not to intra-coded prediction modes. According to these techniques, coding efficiency may be improved by reducing computational complexity.

In this disclosure, the term "coding" refers to encoding or decoding. Similarly, the term "coder" generally refers to any video encoder, video decoder, or combined encoder/decoder (codec). Accordingly, the term "coder" is used herein to refer to a specialized computer device or apparatus that performs video encoding or video decoding. The CBP coding techniques of this disclosure may be applicable to encoders or decoders. The encoder uses the described VLC techniques to encode the CBP, and the decoder uses reciprocal VLC techniques to decode the CBP.

FIG. 1 is a block diagram illustrating an exemplary video encoding and decoding system 100 that may implement techniques of this disclosure. As shown in FIG. 1, system 100 includes a source device 102 that transmits encoded video to a destination device 106 via a communication channel 115. Source device 102 and destination device 106 may comprise any of a wide range of devices. In some cases, source device 102 and destination device 106 may comprise wireless communication device handsets, such as so-called cellular or satellite radiotelephones. The techniques of this disclosure, however, which apply generally to the encoding and decoding of CBPs for macroblocks, are not necessarily limited to wireless applications or settings, and may be applied to a wide variety of non-wireless devices that include video encoding and/or decoding capabilities.

In the example of FIG. 1, source device 102 may include a video source 120, a video encoder 122, a modulator/demodulator (modem) 124 and a transmitter 126. Destination device 106 may include a receiver 128, a modem 130, a video decoder 132, and a display device 134. In accordance with this disclosure, video encoder 122 of source device 102 may be configured to encode a CBP for a CU of video data, wherein the CBP comprises syntax information that identifies individually whether or not non-zero data is included in each respective Y, U, and V component of the CU. Video encoder may encode the CBP using a single VLC code word that includes a plurality of CBF that indicate whether or not non-zero data is included in each respective Y, U, and V component of the CU. Also in accordance with this disclosure, video encoder 122 of source device 102 may be configured to encode a CBP for a group of blocks of a CU collectively as a single VLC code word. The group of blocks may comprise PU, TU, or other block of the CU. The group of blocks may also comprise one or more luma (Y) or chroma (U, V) components associated with PU, TU, or other block of the CU.

Luminance blocks (Y) and chrominance blocks (U, V), for which the CBP individually identifies whether non-zero data exist, generally comprise residual blocks of transform coefficients. The transform coefficients may be produced by transforming residual pixel values indicative of differences between a predictive block and the original block being coded. The transform may be an integer transform, a DCT transform, a DCT-like transform that is conceptually similar to DCT, or the like.

Reciprocal CBP decoding may also be performed by video decoder 132 of destination device 106. That is, video decoder 132 may also be configured to decode a CBP for a CU of video data, wherein the CBP comprises syntax information (e.g., a plurality of CBF) that identifies whether or not non-zero data is included in a Y block of transform coefficients and the respective U and V blocks of transform coefficients individually. To decode the CBP consistent with the techniques described herein, video decoder 132 may select one or more VLC tables and decode the CBP to determine whether or not each respective Y, U, and V component of the coding unit includes non-zero coefficients.

The illustrated system 100 of FIG. 1 is merely exemplary. The CBP encoding and decoding techniques of this disclosure may be performed by any encoding or decoding devices. Source device 102 and destination device 106 are merely examples of coding devices that can support such techniques.

Video encoder 122 of source device 102 may encode video data received from video source 120. Video source 120 may comprise a video capture device, such as a video camera, a video archive containing previously captured video, or a video feed from a video content provider. As a further alternative, video source 120 may generate computer graphics-based data as the source video, or a combination of live video, archived video, and computer-generated video. In some cases, if video source 120 is a video camera, source device 102 and destination device 106 may form so-called camera phones or video phones. In each case, the captured, pre-captured or computer-generated video may be encoded by video encoder 122.

In system 100, once the video data is encoded by video encoder 122, the encoded video information may then be modulated by modem 124 according to a communication standard, e.g., such as code division multiple access (CDMA) or any other communication standard or technique, and transmitted to destination device 106 via transmitter 126. Modem 124 may include various mixers, filters, amplifiers or other components designed for signal modulation. Transmitter 126 may include circuits designed for transmitting data, including amplifiers, filters, and one or more antennas. Receiver 128 of destination device 106 receives information over channel 115, and modem 130 demodulates the information. Again, the video decoding process performed by video decoder 132 may include similar (e.g., reciprocal) CBP decoding techniques to the CBP encoding techniques performed by video encoder 122.

Communication channel 115 may comprise any wireless or wired communication medium, such as a radio frequency (RF) spectrum or one or more physical transmission lines, or any combination of wireless and wired media. Communication channel 115 may form part of a packet-based network, such as a local area network, a wide-area network, or a global network such as the Internet. Communication channel 115 generally represents any suitable communication medium, or a collection of different communication media, for transmitting video data from source device 102 to destination device 106.

Video encoder 122 and video decoder 132 may operate very similar to a video compression standard such as the emerging HVEC standard as discussed above. Accordingly, the CBP coding techniques and transform sizes applied in the coding process may differ from that defined in ITU-T H.264. Nevertheless, the techniques of this disclosure may be readily applied in the context of a variety of other video coding standards. Specifically, any video coding standard that allows for differently sized transforms at the encoder or the decoder may benefit from the VLC techniques of this disclosure.

Although not shown in FIG. 1, in some aspects, video encoder 122 and video decoder 132 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 122 and video decoder 132 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 122 and video decoder 132 may be included in one or more encoders or decoders, either of which may be integrated as part of a combined encoder/decoder (CODEC) in a respective mobile device, subscriber device, broadcast device, server, or the like.

In some cases, devices 102, 106 may operate in a substantially symmetrical manner. For example, each of devices 102, 106 may include video encoding and decoding components. Hence, system 100 may support one-way or two-way video transmission between video devices 102, 106, e.g., for video streaming, video playback, video broadcasting, or video telephony.

During the encoding process, video encoder 122 may execute a number of coding techniques or operations. In general, video encoder 122 operates on video blocks within individual video frames (or other independently coded units such as slices) in order to encode the video blocks. Frames, slices, portions of frames, groups of pictures, or other data structures may be defined as independent data units that include a plurality of video blocks, and syntax elements may be included at such different independent data units. The video blocks within independent data units may have fixed or varying sizes, and may differ in size according to a specified coding standard. In some cases, each video frame may include a series of independently decodable slices, and each slice may include one or more LCUs.

In this disclosure, the phrase "block" refers to any size or type of video block. For example, the phrase "block" may refer to one or more of a macroblock, LCU, CU, sub-CU, TU, or PU. Moreover, blocks may refer to blocks of video data in the pixel domain, or blocks of data in a transform domain such as a discrete cosine transform (DCT) domain, a domain similar to DCT, a wavelet domain, or the like. In addition, the phrase block may refer to the luma and chroma blocks that are generally residual blocks of data in the transform domain.

Referring again to FIG. 1, video encoder 122 may perform predictive coding in which a video block being coded is compared to another block of video data in order to identify a predictive block. This process of predictive coding is often referred to as motion estimation and motion compensation. Motion estimation estimates video block motion relative to one or more predictive video blocks of one or more predictive frames (or other coded units). Motion compensation generates the desired predictive video block from the one or more predictive frames or other coded units. Motion compensation may include an interpolation process in which interpolation filtering is performed to generate predictive data at fractional pixel precision.

After generating the predictive block, the differences between the current video block being coded and the predictive block are coded as a residual block, and prediction syntax (such as a motion vector) is used to identify the predictive block. The residual block may be transformed and quantized. Transform techniques may comprise a DCT process or conceptually similar process, integer transforms, wavelet transforms, or other types of transforms. In a DCT or DCT-like process, as an example, the transform process converts a set of pixel values (e.g., residual values) into transform coefficients, which may represent the energy of the pixel values in the frequency domain. Quantization is typically applied on the transform coefficients, and generally involves a process that limits the number of bits associated with any given transform coefficient.

Following transform and quantization, entropy coding may be performed on the transformed and quantized residual video blocks. Syntax elements, such as the CBPs described herein, various filter syntax information and prediction vectors defined during the encoding, may also be included in the entropy-coded bitstream. In general, entropy coding comprises one or more processes that collectively compress a sequence of quantized transform coefficients and/or other syntax information. Scanning techniques, such as zig-zag scanning techniques, are performed on the quantized transform coefficients in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded to generate the video data used for subsequent prediction-based coding of subsequent video blocks. At this stage, filtering may be employed in order to improve video quality, and e.g., remove blockiness or other artifacts from decoded video. This filtering may be in-loop or post-loop. With in-loop filtering, the filtering of reconstructed video data occurs in the coding loop, which means that the filtered data is stored by an encoder or a decoder for subsequent use in the prediction of subsequent image data. In contrast, with post-loop filtering, the filtering of reconstructed video data occurs out of the coding loop, which means that unfiltered versions of the data are stored by an encoder or a decoder for subsequent use in the prediction of subsequent image data.

Figure 2:
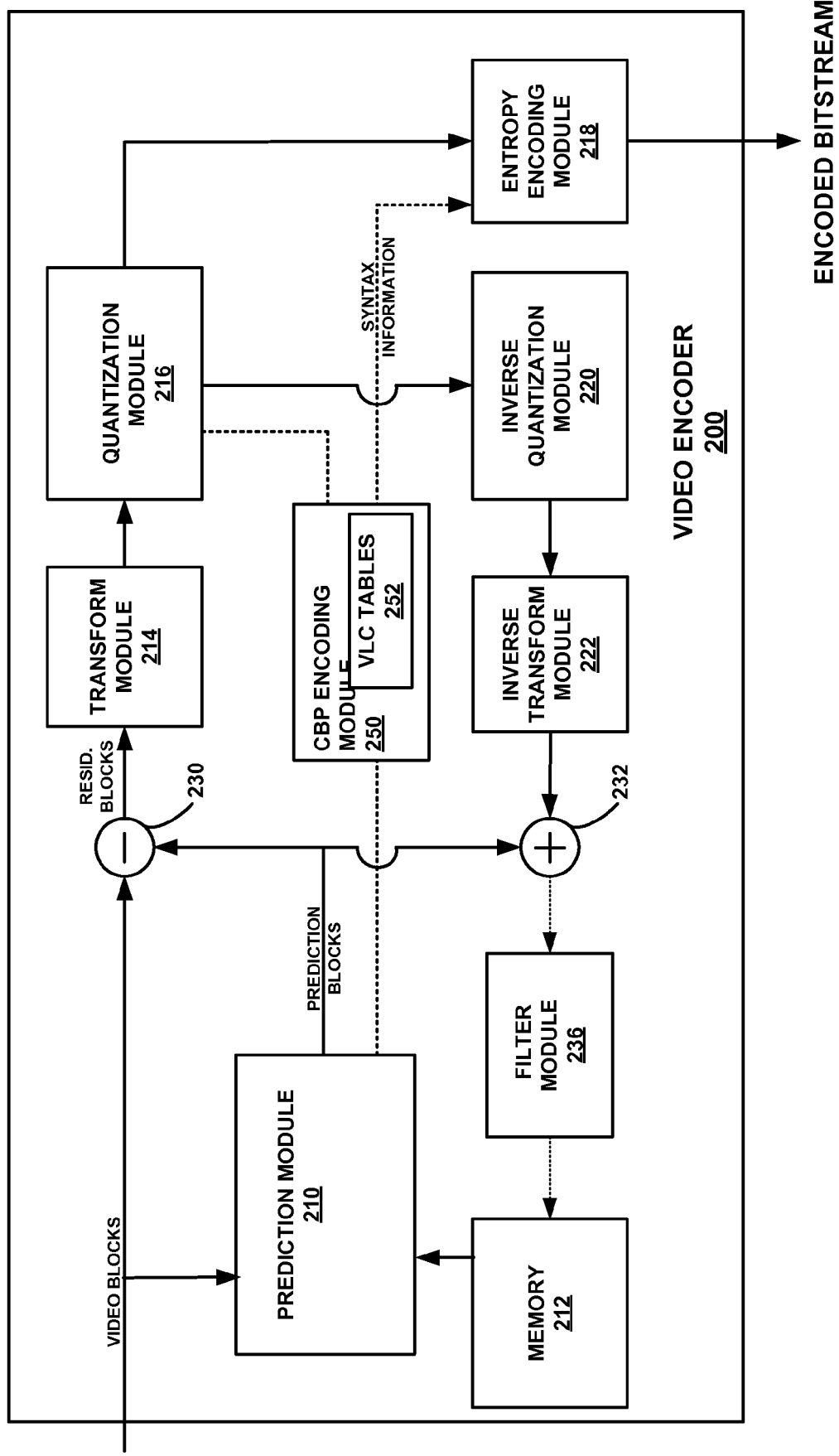
FIG. 2 is a block diagram illustrating an exemplary video encoder that may implement one or more techniques of this disclosure.

FIG. 2 is a block diagram illustrating an example video encoder 200 consistent with this disclosure. Video encoder 200 may correspond to video encoder 122 of source device 100, or a video encoder of a different device. As shown in FIG. 2, video encoder 200 includes a prediction module 210, adders 230 and 232, and a memory 212. Video encoder 200 also includes a transform module 214 and a quantization module 216, as well as an inverse quantization module 220 and an inverse transform module 222. Video encoder 200 also includes a CBP encoding module 250 that applies VLC tables 252. In addition, video encoder 200 includes an entropy coding module 218. VLC tables 252 are illustrated as part of CBP encoding module 250 insofar as CBP encoding module 250 applies the tables. The VLC tables 252, however, may actually be stored in a memory location, such as memory 212, which may be accessible by CBP encoding module 250 to apply the tables. Filter module 236 may perform in-loop or post loop filtering on reconstructed video blocks.

During the encoding process, video encoder 200 receives a video block to be coded, and prediction module 210 performs predictive coding techniques. For inter coding, prediction module 210 compares the video block to be encoded to various blocks in one or more video reference frames or slices in order to define a predictive block. For intra coding, prediction module 210 generates a predictive block based on neighboring data within the same coded unit. Prediction module 210 outputs the prediction block and adder 230 subtracts the prediction block from the video block being coded in order to generate a residual block.

For inter coding, prediction module 210 may comprise motion estimation and motion compensation modules (not depicted in FIG. 2) that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction module 210 generates a predictive block based on neighboring data within the same frame, slice, or other unit of video data. One or more intra-prediction modes may define how an intra prediction block can be defined.

Motion compensation for inter-coding may include interpolations to sub-pixel resolution. Interpolated predictive data generated by prediction module 210, for example, may be interpolated to half-pixel resolution, quarter-pixel resolution, or even finer resolution. This permits motion estimation to estimate motion of video blocks to such sub-pixel resolution.

After prediction module 210 outputs the prediction block, and after adder 230 subtracts the prediction block from the video block being coded in order to generate a residual block, transform module 214 applies a transform to the residual block. The transform may comprise a discrete cosine transform (DCT), an integer transform, or a conceptually similar transform such as that defined by the ITU H.264 standard, the HVEC standard, or the like. In some examples, transform module 214 may perform differently sized transforms and may select different sizes of transforms for coding efficiency and improved compression. Wavelet transforms, integer transforms, sub-band transforms or other types of transforms may also be used. In any case, transform module 214 applies a particular transform to the residual block of residual pixel values, producing a block of residual transform coefficients. The transform may convert the residual pixel value information from a pixel domain to a frequency domain.

Quantization module 216 then quantizes the residual transform coefficients to further reduce bit rate. Quantization module 216, for example, may limit the number of bits used to code each of the coefficients. After quantization, entropy coding module 218 may scan and entropy encode the data. For example, entropy coding module may scan the quantized coefficient block from a two-dimensional representation to one or more serialized one-dimensional vectors. The scan order may be pre-programmed to occur in a defined order (such as zig-zag scanning, horizontal scanning, vertical scanning, or another pre-defined order), or possibly adaptively defined based on previous coding statistics. Following this scanning process, entropy encoding module 218 encodes the quantized transform coefficients (along with any syntax elements) according to an entropy coding methodology, such as CAVLC or CABAC, to further compress the data. Syntax information included in the entropy coded bitstream may include prediction syntax from prediction module 210, such as motion vectors for inter coding or prediction modes for intra coding. Syntax information included in the entropy coded bitstream may also include filter information, such as that applied for interpolations by prediction module 210 or the filters applied by filter module 236. In addition, syntax information included in the entropy coded bitstream may also include CBPs associated with a CU and/or block, and the techniques of this disclosure specifically define VLC coding of CBPs based on VLC tables 252 of CBP encoding module 250.

CAVLC is one type of entropy coding technique supported by the ITU H.264/MPEG4, AVC standard, which may be applied on a vectorized basis by entropy coding module 218. CAVLC uses VLC tables (not shown in module 218) in a manner that effectively compresses serialized "runs" of transform coefficients and/or syntax elements. CABAC is another type of entropy coding technique supported by the ITU H.264/MPEG4, AVC standard, which may be applied on a vectorized basis by entropy coding module 218. CABAC may involve several stages, including binarization, context model selection, and binary arithmetic coding. In this case, entropy coding module 218 codes transform coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding module 218, the encoded video may be transmitted to another device or archived for later transmission or retrieval. Again, the encoded video may comprise the entropy coded vectors and various syntax, which can be used by the decoder to properly configure the decoding process. Inverse quantization module 220 and inverse transform module 222 apply inverse quantization and inverse transform, respectively, to reconstruct the residual block in the pixel domain. Summer 232 adds the reconstructed residual block to the prediction block produced by prediction module 210 to produce a reconstructed video block for storage in memory 212. Memory 212 may store a frame or slice of blocks for use in motion estimation with respect to blocks of other frames to be encoded. Prior to such storage, in the case of in-loop filtering, filter module 236 may apply filtering to the video block to improve video quality. Such filtering by filter module 236 may reduce blockiness or other artifacts. Moreover, filtering may improve compression by generating predictive video blocks that comprise close matches to video blocks being coded. Filtering may also be performed post-loop such that the filtered data is output as decoded data, but unfiltered data is used by prediction module 210.

Figure 3:
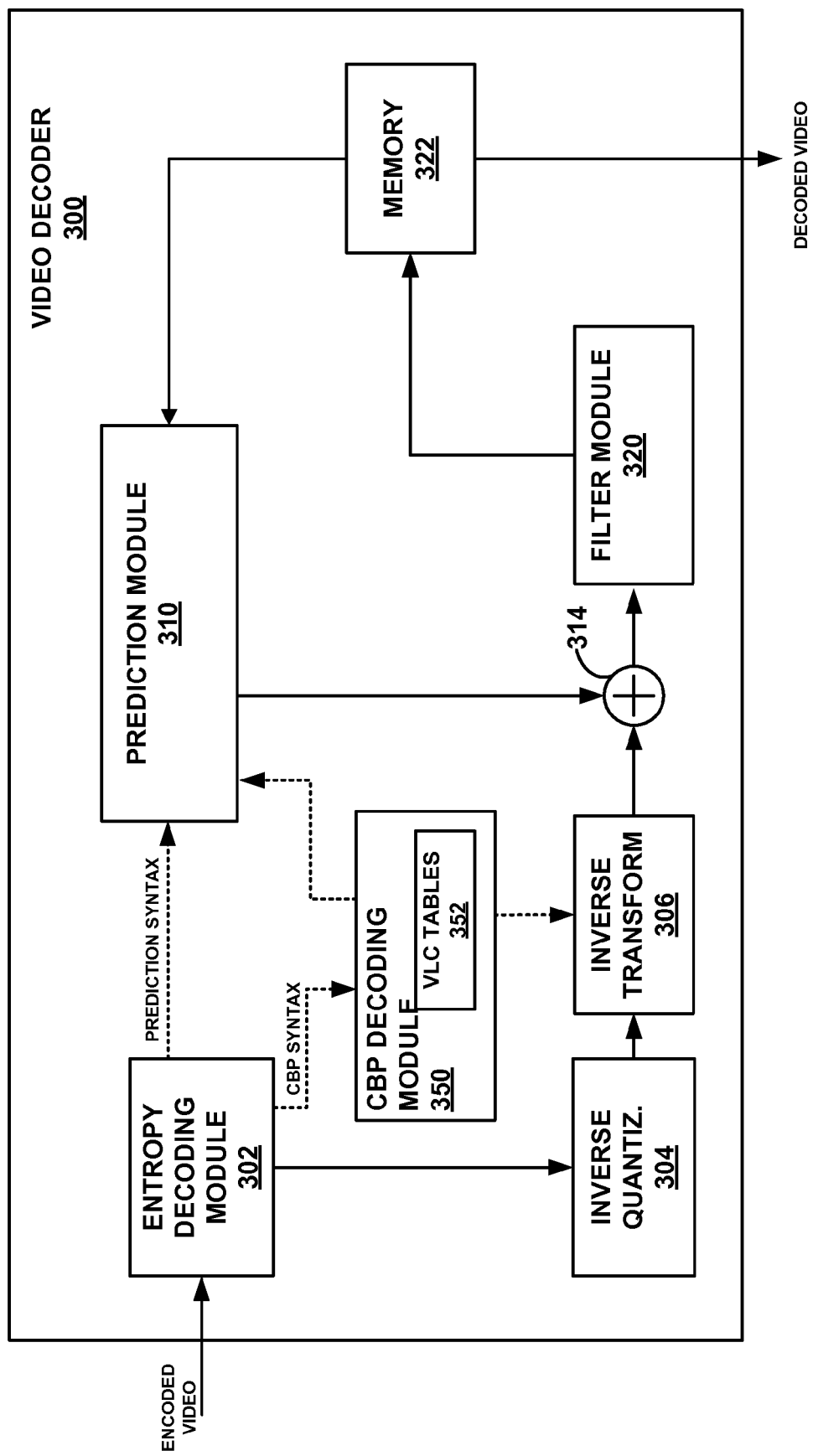
FIG. 3 is a block diagram illustrating an exemplary video decoder that may implement one or more techniques of this disclosure.

FIG. 3 is a block diagram illustrating an example of a video decoder 300, which decodes a video sequence that is encoded in the manner described herein. The received video sequence may comprise an encoded set of image frames, a set of frame slices, a commonly coded group of pictures (GOPs), or a wide variety of coded video units that include encoded video blocks and syntax information to define how to decode such video blocks.

Video decoder 300 includes an entropy decoding module 302, which performs the reciprocal decoding function of the encoding performed by entropy encoding module 218 of FIG. 2. In particular, entropy decoding module 302 may perform CAVLC or CABAC decoding, or decoding according to any other type of reciprocal entropy coding to that applied by entropy encoding module 218 of FIG. 2. Entropy decoded video blocks in a one-dimensional serialized format may be converted from one or more one-dimensional vectors of coefficients back into a two-dimensional block format. The number and size of the vectors, as well as the scan order defined for the video blocks may define how the two-dimensional block is reconstructed. Entropy decoded prediction syntax may be sent from entropy decoding module 302 to prediction module 310, and entropy CBP syntax may be sent from entropy decoding module 302 to CBP decoding module 350.

Video decoder 300 also includes a prediction module 310, an inverse quantization unit 306, an inverse transform module 304, a memory 322, and a summer 314. In addition, video decoder 300 also includes a CBP decoding module 350 that include VLC tables 352. Although VLC tables 352 are illustrated as part of CBP decoding module 350 insofar as CBP decoding module 350 applies the VLC tables 352, VLC tables 352 may actually be stored in a memory location, such as memory 322, that is accessed by CBP decoding module 350. In this case, VLC tables 352 may be accessible by CBP decoding module 350 to apply the tables and map the received VLC code word to the corresponding data of one or more of VLC tables 352. According to one aspect of this disclosure, decoding module 350 may map a VLC code word to an entry of a VLC table to decode a CBP that indicates individually whether or not respective Y, U, and V components each includes non-zero coefficients. According to another aspect of this disclosure, decoding module 350 may map a VLC code word to an entry of a VLC table to decode a CBP that indicates whether a group of blocks of a CU include non-zero coefficients.

A wide variety of video compression technologies and standards perform spatial and temporal prediction to reduce or remove the redundancy inherent in input video signals. As explained above, an input video block is predicted using spatial prediction (i.e. intra prediction) and/or temporal prediction (i.e. inter prediction or motion estimation). The prediction modules described herein may include a mode decision module (not shown) in order to choose a desirable prediction mode for a given input video block. Mode selection may consider a variety of factors such as whether the block is intra or inter coded, the prediction block size and the prediction mode if intra coding is used, and the motion partition size and motion vectors used if inter coding is used. A prediction block is subtracted from the input video block, and transform and quantization are then applied on the residual video block as described above. The transforms may have variable sizes according to this disclosure, and CBP encoding and decoding may be based on the transform sizes used for a CU or block. The transforms to be used may be signaled in macroblock syntax, or may be adaptively determined based on contexts or other factors.

The quantized coefficients, along with the mode information, may be entropy encoded to form a video bitstream. The quantized coefficients may also be inverse quantized and inverse transformed to form the reconstructed residual block, which can be added back to the prediction video block (intra predicted block or motion compensated block depending on the coding mode chosen) to form the reconstructed video block. An in-loop or post-loop filter may be applied to reduce the visual artifacts in the reconstructed video signal. The reconstructed video block is finally stored in the reference frame buffer (i.e., memory) for use of coding of future video blocks.

The CBP encoding techniques described in this disclosure may be performed by CBP encoding module 250 of FIG. 2 by using VLC tables 252. Again, although VLC tables 252 are illustrated within CBP encoding module 250, the VLC tables may actually be stored in a memory location (such as memory 212) and accessed by CBP encoding module 250 in the coding process. The reciprocal CBP decoding techniques of this disclosure may be performed by CBP decoding module 350 of FIG. 3 by applying VLC tables 352. As with CBP encoding module 250, with CBP decoding module 350, VLC tables 352 are illustrated within CBP decoding module 350. This illustration, however, is for demonstrative purposes. In actuality, VLC tables 352 may be stored in a memory location (such as memory 322) and accessed by CBP decoding module 350 in the decoding process. The term "coding," as used herein, refers to any process that includes encoding, decoding or both encoding and decoding.

As described above, to code a coded block flag according to the techniques described herein, a coding module (e.g., encoding module 250, decoding module 350) may generate and/or select one or more variable length code (VLC) tables. The one or more VLC tables may each include a plurality of VLC code words that map to a respective CBP value for a block. For example, a VLC code word as described herein may represent a CBF for each of Y, U, and V components of a block, that indicate whether each respective component includes non-zero coefficients. According to another example, a VLC code word as described herein may represent CBF for each of a plurality of blocks of a CU that individually identify whether each of the plurality of blocks include non-zero coefficients.

Encoding module 250 may determine a coded block flag (CBF) for each of a plurality of components of a block of a CU, such as each of a luminance (Y), first chrominance (U), and second chrominance (V) component of the block of the CU. The encoding module 250 may determine a value of the CBF for the first chrominance (U) component and the second chrominance (V) component independent of the other. For example, encoding module 250 may determine CBF for the first chrominance (U) component that comprises a value of zero (0) if the first chrominance (U) component does not include any non-zero coefficients, and a value of one (1) if the first chrominance (U) component does include one or more non-zero coefficients. Encoding module 250 may determine CBF for the second chrominance (V) component that comprises a value of zero (0) if the second chrominance (V) component does not include any non-zero coefficients, and a value of one (1) if the second chrominance (V) component does include one or more non-zero coefficients.

Encoding module 250 may signal respective CBFs for each of the respective luminance (Y), first chrominance (U), and second chrominance (V) in combination as a CBP represented as a single VLC code word. For example, encoding module 250 may create and/or access a VLC table, such as the example VLC tables shown in tables 1 and 2, to determine a value of a VLC code word that represents a CBP that includes the collective CBF values for each of luminance (Y), first chrominance (U), and second chrominance (V) components in combination, and communicate the determined code word to decoding module 350. Decoding module 350 may access the same or similar VLC table as the VLC table depicted in tables 1 and 2 to determine, or decode, the CBP to determine the respective CBF for each of the luminance (Y), first chrominance (U), and second chrominance (V) components of a CU.

In some examples, CBP encoding module 250 may adaptively generate a VLC table based on a context of neighboring blocks of a CU or of other CUs. For example, CBP encoding module 250 may determine at least one CBP value for one or more neighboring blocks of a block to be encoded, and assign variable length code words of a VLC table to represent particular CBP values based on a context defined by one or more neighboring CUs or blocks. For example, if one or more neighboring blocks do not include any non-zero coefficients, a likelihood that a current block also will not include any non-zero coefficients may be higher than if the neighboring blocks do include non-zero coefficients. According to this example, a shorter VLC code word may be assigned to CBP comprising combinations of CBF for the respective luma (Y), first chroma (U), and second chroma (V) components of a block that have a value of zero (representing no non-zero coefficients for the respective component). According to the example set forth above, encoder 250 may assign a CBP of (Y,U,V)=(0,0,0), which may indicate that each of the respective Y, U, and V components do not have any non-zero coefficients, a shortest VLC code word, e.g. 1-bit code word, in a VLC table. Also according to this example, encoder 250 may assign a CBP of (Y,U,V)=(1,0,0), (Y,U,V)=(0,1,0), or (Y,U,V)=(0,0,1) short VLC code word. The encoder may further assign less likely CBP values longer VLC code words based on context. For example, if one or more neighboring blocks do not include any non-zero coefficients, a CBP of (Y,U,V)=(1,1,1) may be assigned a longest code word in a VLC table.

Figure 4:
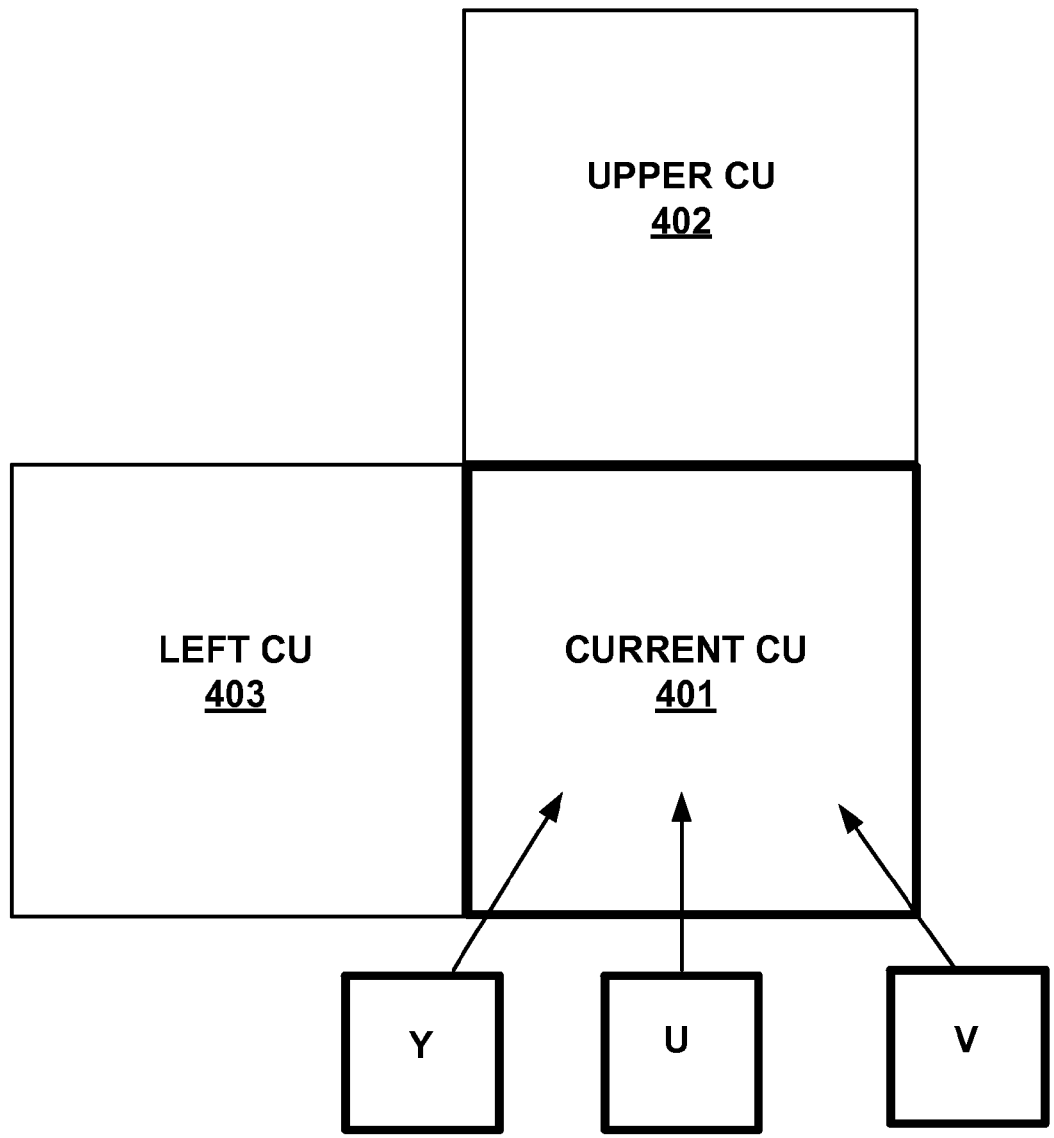
FIG. 4 is a conceptual diagram that illustrates one example of a coding unit (CU) that includes a luma component (Y), a first chrominance component (U), and second chrominance component (V) consistent with the techniques of this disclosure.

FIG. 4 illustrates one example of a current CU 401. Current CU 401 may represent a CU currently being coded. Current CU 401 may have any size, e.g., 8×8, 16×16, 32×32, or 64×64. As depicted in FIG. 4, current CU 401 includes each of an associated Y, U, and V component. In some examples, the Y, U, and V components may each correspond to a size of current CU 401. For example, the respective Y, U, and V components of CU 401 may each have a same size as current CU 401. According to other examples, more than one Y, U, or V component may correspond to current CU 401. For example, current CU may include four respective Y components that each correspond to a subdivided block of a size of current CU. According to one such example, respective U and V components associated with current CU may have a same size as current CU 401. According to another such example, respective U and V components associated with current CU 401 may correspond to a size of a subdivided Y component as described above.

FIG. 4 also illustrates two neighboring CUs 402 and 403 of current CU 401 of video frame 400. As shown in FIG. 4, upper CU 402 is positioned above CU 401 in video frame 400, while left CU 403 is positioned to the left of CU 401 in video frame 400. In some examples, upper CU 402 and left CU 403 may include associated Y, U, and V components as described above with respect to current CU 401.

According to the techniques of this disclosure, a coder may signal a single variable length code word include a plurality of CBF that individually represent whether each of the Y, U, and V components of current CU 401 include any non-zero coefficients. According to one example, VLC table may be selected based on a context defined by one or more CPB of neighboring CUs 402, 403. For example, CBP encoding module 250 may select a VLC table to code CBP for the collective Y, U, and V components of current CU 401 based on whether or not one or more of neighboring CUs 402, 403 include non-zero coefficients.

According to one specific example, a coder (e.g., CBP encoding module 250 and CBP decoding module 350) may determine one or more context for current CU 401 based on a determined CBP for one or more neighboring CUs 402, 403 as follows:

Context 1: CBP values for both upper CU 402 and left CU 403 indicate that only zero-value coefficients exist.
Context 2: CBP values for one of upper CU 402 and left CU 403 indicate that only zero-value coefficients exist and CBP values for one of upper CU 402 and left CU 403 indicate that non-zero coefficients exist.
Context 3: CBP values for both upper CU 402 and left CU 403 both indicate that non-zero coefficients exist.

Accordingly, neighboring data is used to define a context, and the neighboring data may include respective CBPs associated with neighboring blocks of video data. According to the example set forth above, a first context (e.g., context 1) comprises when a CBP of a first neighboring CU 402 and a CBP of a second neighboring CU 403 indicate that only zero-value coefficients exist, a second context (e.g., context 2) comprises when a CBP of a first neighboring CU 402 and a CBP of a second neighboring CU 403 indicates that only zero-value coefficients exist in one of neighboring CUs 402, 403 and non-zero coefficients exist in the other of neighboring CU 402, 403, and a third context (e.g., context 3) comprises when a CBP of both the first neighboring CU 402 and a CBP of a second neighboring CU 403 indicate that non-zero coefficients exist.

In other examples, the CBP values of other portions of the neighboring blocks could be used to define the contexts. For example, CBP values for one or more blocks of neighboring CUs 402, 403 may be used to identify a context for coding of current CU 401. In any case, given the contexts defined for the current CU, the CBP for the CU may be encoded and decoded based on the following equations and tables. For example, encoding may involve selecting and/or generating one or more VLC code tables with code numbers assigned to CBP values based on one or more contexts as described above. As another example, a decoder may receive one or more VLC code words, and decode the one or more VLC code words using a VLC table selected based on one or more contexts as described above. According to some examples, VLC tables may be pre-defined but selected in the manner described herein. In other cases, the VLC tables themselves may be adaptively generated and selected and applied in the manner described herein.

TABLE 1

| CBP = (U, V, Y) | |
|---|---|
| Coded block flags (CBF) (U V Y) | Unary codeword |
| 0 0 0 | 1 |
| 0 0 1 | 01 |
| 0 1 0 | 001 |
| 0 1 1 | 00001 |
| 1 0 0 | 0001 |
| 1 0 1 | 000001 |
| 1 1 0 | 0000001 |
| 1 1 1 | 0000000 |

Table 1 illustrates one example of a VLC table that may be used/generated by CBP encoding module 250 and/or CBP decoding module 350 according to context 1 as described above with reference to FIG. 4. According to the example of table 1, CBP encoding module 250 has assigned a CBP of (U, V, Y)=(0,0,0) a single bit VLC code word of one (1). CBP encoding module 250 may assign the CBP of (U, V, Y)=(0,0,0) a shortest code word worth length, because based on context 1, a value of (0,0,0) may be the most likely CBP for the (U, V, Y) components of a current CU 401. CBP encoding module 250 has also assigned a two-bit code word to the CBP value (0,0,1), which may be the second most likely CBP based on context 1 described above. CBP encoding module 250 has also assigned a three-bit code word to the CBP value (0,1,0), and a four-bit code word to the CBP value (1,0,0), which may be the third and fourth more likely combinations according to context 1. As also depicted in table 1, CBP encoding module 250 has assigned seven-bit code words to CBP (1,1,0) and (1,1,1), respectively, which may be the least likely combinations according to context 1.

TABLE 2

CBP = (U, V, Y)

| Coded block flags (CBF) (U V Y) | Unary codeword |
|---|---|
| 0 0 0 | 0000000 |
| 0 0 1 | 0000001 |
| 0 1 0 | 000001 |
| 0 1 1 | 0001 |
| 1 0 0 | 00001 |
| 1 0 1 | 001 |
| 1 1 0 | 01 |
| 1 1 1 | 1 |

Table 2 illustrates one example of a VLC table that may be used/generated by encoding module 250 and/or decoding module 351 according to context 3 as described above with reference to FIG. 4. According to the example of table 2, encoding module 250 has assigned a CBP of (U, V, Y)=(1,1,1) a single bit VLC code word of one (1). Encoding module 250 may assign the CBP of (U, V, Y)=(1,1,1) a shortest code worth length, because based on context 3, a value of (1,1,1) may be the most likely CBP for the (U, V, Y) components of a current CU 401 or block 410-413. Encoding module has also assigned a two-bit code word to the CBP value (1,1,0), which may be the second most likely CBP based on context 1 described above. Encoding module has also assigned a three-bit code word to the CBP value (1,0,1), and a four-bit code word to the CBP value (0,1,1), which may be the third and fourth most likely combinations according to context 3. As also depicted in table 2, encoding module 250 has assigned seven-bit code words to CBP (0,0,0) and (0,0,1), respectively, which may be the least likely combinations according to context 3.

According to the examples described above, a variable length code table may be accessed and/or created based on a context defined by one or more other CUs or blocks of a video frame. As described above, the context may be based on whether the one or more neighboring CUs (e.g., CU 402, 403 as illustrated in FIG. 4) or blocks include non-zero coefficients, which may be determined based on a CBP for the neighboring block or unit.

According to other examples, such a context may be determined based on other factors. For example, a CBP encoding module 250 and/or CBP decoding module 350 may determine such a context based on one or more of the following non-limiting factors: partition depth, TU size, and/or current CU prediction mode, such as intra or inter prediction (which includes uni-directional inter prediction or bi-directional inter prediction). These factors, including neighboring CBP, may be used either separately or jointly to determine a context. For example, a context may be determined based on a size of a TU, a prediction mode associated with a PU, or both. According to another example, a context may be determined based on one or more CBP of one or more neighboring CU or blocks (e.g., neighboring CU 402, 403 as depicted in FIG. 4), together with a prediction mode associated with a PU and/or a transform size of a TU.

The example of VLC tables depicted above in tables 1 and 2 are merely some examples of VLC tables that may be selected for decoding a coding unit as described herein. In the examples of tables 1 and 2, VLC code words are assigned a number of bits based on a likelihood that a current CU includes a particular CBP value based on whether or not one or more neighboring CU include non-zero coefficients. In the example of tables 1 and 2, a most likely CBP for the respective Y, U, and V components of a CU is assigned a single bit, a second most likely combination is assigned two bits, a third most likely combination is assigned three bits, and so on. Such a VLC table may be referred to as a unitary VLC table. According to other examples, a VLC table as described herein may not be unitary. Instead, more than one code word in the VLC table may share a same number of bits. For example, a most likely CBP may be assigned two bits, and the second, third, and fourth most likely combination may be assigned three bits. A fifth, sixth and seventh most likely combination may be assigned four bits.

As described above, in some examples, a codec (e.g., encoder, decoder) may be configured to select from among a plurality of VLC tables with different mapping between code word and CBP value. In some examples, a VLC table for coding a particular CU may be selected base on a size of the CU, a prediction mode of the CU (e.g., intra, inter coded), a context of the CU and/or other factor. According to the examples depicted in tables 1 and 2, VLC code words are assigned to different CBP values according to their likelihood. Shorter VLC code words are assigned to those CBP values that may be more likely to occur.

In some examples, a VLC table for a block may be reordered during encoding or decoding process according to relatively likelihoods of the respective CBP values in already coded CUs. According to this example, a coder may access an index table (code word index mapping table) to determine a mapping between a VLC code word and a CBP value. For example, such a mapping may define, for a plurality of VLC tables that may be used for a CU, a relative index within each of the tables that maps a CBP value to a particular code word. According to these examples, an encoder may access such an index table to determine a code word representing a CBP for the CU. Also according to these examples, a decoder may access such an index table to determine an index within one or more VLC tables where a particular code word is mapped to a CBP value.

In some examples, mapping defined by an index table as described may be adaptive and/or dependent on a context as described above. A mapping defined by an index table, along with a selected VLC table, may be used to code a CBP for a CU.

Figure 5:
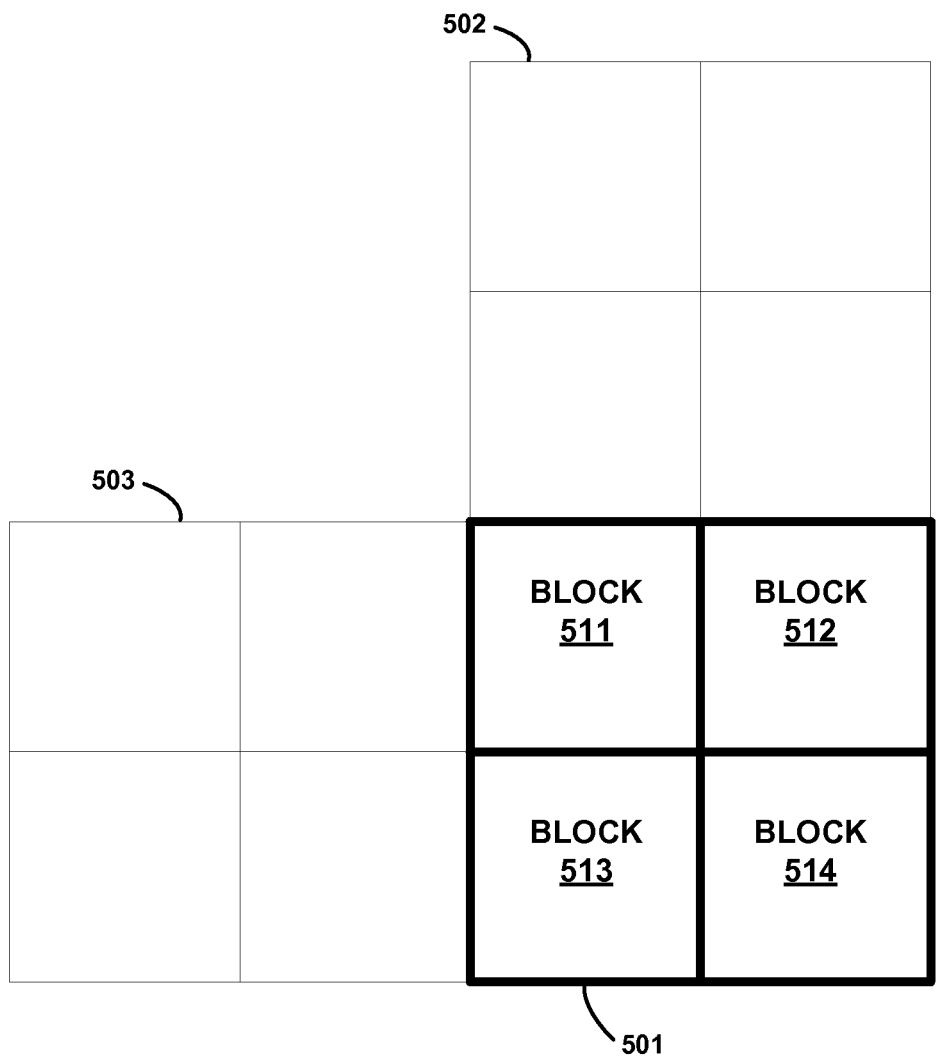
FIG. 5 is a conceptual diagram that illustrates one example of a CU split into multiple blocks consistent with the techniques of this disclosure.

FIG. 5 is a conceptual diagram that illustrates one example of a CU 501 split into four quarter sized luma blocks 511-514. According to one aspect of this disclosure, CBP corresponding to a certain video component of blocks of a CU 501 may be grouped together and signaled as a single VLC code word. For example, according to the example of FIG. 5, a coder may determine whether each of blocks 511-514 include non-zero luma (Y) coefficients or not. According to this example, the coder may generate a four-bit CBP value that includes, for each of blocks 511-514, CBF that indicate whether the block includes non-zero luma coefficients or not. Such a four-bit value may be mapped to and signaled using a single VLC code word of a VLC table.

In some examples, luma blocks 511-514 as depicted in FIG. 5 may each include associated chroma components. According to these examples, coder may also determine whether or not chroma (U, V) components associated with each of blocks 511-514 include any non-zero coefficients. According to one example, the coder may generate a four bit CBP that includes, for each of blocks 511-514, CBF that indicate whether or not the respective U and V chroma components collectively include non-zero coefficients or not. According to other examples, a coder may generate two four bit (or a single 8 bit) CBP that includes CBF for each individual U and V component.

In some examples, a coder may only signal a single VLC code word that represents a CBP that includes respective CBF for four luma blocks 511-514 depicted in FIG. 5. In other examples, a coder may also signal a separate a single VLC code word that represents CBP that includes respective CBF for chroma components associated with luma blocks 511-514. According to other examples, CBP for a plurality of luma blocks and CBP for a plurality of associated chroma (U,V) may be signaled in combination as a single VLC code word.

In some examples, a coder may determine one or more index tables that represent a mapping between VLC code word and grouped 4-bit CBP values for blocks 511-514 of CU 501 based on one or more contexts as described above with respect to Y, U, and V components of a CU. For example, a coder may determine an index table based on whether one or more CU, or specific blocks of a CU, include non-zero coefficients or not. For example, as depicted in FIG. 5, if upper block 502, left block 503 only include zero value coefficients, a grouped 4-bit CBP value representing a CBF value of zero for each of the four blocks (e.g., (B511, B512, B513, B514) =(0,0,0,0) may be mapped to a shortest VLC code word, while a grouped 4-bit CBP value representing a coded block flag value of 1 for each block (e.g., B511, B512, B513, B514)= (1,1,1,1) may be mapped to a longer VLC code word.

Signaling a CBP for a certain video component (e.g., luma, chroma components) of blocks 511-514 of a CU 501 grouped together as a single VLC code word as described above may improve coding efficiency. For example, by signaling the CBP for the blocks as a single VLC code word, an amount of data (e.g., number of bits) needed to signal the CBP may be reduced.

As discussed above, in some examples a VLC table may be selected from among a plurality of VLC tables based on one or more factors. In some examples, values of CBP for inter coded luma blocks may be more random than that for intra coded luma blocks. Using different VLC tables based on a context of a CU may therefore not be as effective for luma blocks of an inter coded CU as it is for luma blocks of an intra coded CU. According to one example consistent with the techniques described herein, to code a CBP value, a VLC table of a plurality of VLC tables may be selected for luma blocks of an intra coded CU, while a single VLC table may be used for luma blocks of an inter coded CU, regardless of a context of the inter coded CU.

For chroma blocks, regardless of the prediction mode (i.e. intra or inter) of the current block, their coded block flags have similar characteristics as the coded block flags for inter coded luma blocks. In other words, their values may be more random. Therefore for the same reason, coded block flags for chroma blocks may be coded similarly as that for luma blocks of a inter coded block. To be more specific, regardless of the prediction mode of a current block, CBF for chroma blocks may be coded using a single VLC table.

As described above, an index table may be selected based on context, regardless of which VLC table is used. According to this example, an index table of a plurality of index tables that provides mapping between code words and CBP values may be selected to code a current CU based on a context of the CU. As set forth above, to code a CBP value, a VLC table of a plurality of VLC tables may be selected for an intra coded CU, while a single VLC table may be used for an inter coded CU, regardless of a context of the inter coded CU.

As described above, the techniques of this disclosure may address coding techniques that allow for different transform sizes. As set forth above, in some examples a CU may be split into smaller blocks for transform operations (e.g., TU as described above) or prediction operations (e.g., PU).

In some examples, an encoder may signal a transform index for a CU or TU. A transform index may indicate a size of the CU or TU such that a coder may determine a transform that corresponds to a size of the CU or TU. In some examples, a transform index may be signaled for the respective luminance (Y) and chrominance (U and V) components of a CU individually. In other examples, a coder may collectively signal a size of a plurality of blocks of a CU, e.g., using a single value that represents a size shared among the plurality of blocks.

According to another aspect of this disclosure, one or more transform indexes as described above may or may not be signaled based on a CBP value for a CU or block. For example, a coder may not signal a transform index for respective blocks of a CU (e.g., respective Y, U, and V components) if a CU only includes zero value coefficients. For example, a coder may not signal a transform index for a CU if a CBP for the CU indicates that the CU only includes zero value coefficients. However, if the CBP for the CU indicates that the CU includes non-zero coefficients, the coder may signal a transform index for the CU.

As described above, a CBP of a CU may be signaled according to VLC techniques. According to other aspects of this disclosure, a prediction mode of a prediction unit (PU) of a CU may be signaled using VLC techniques. In some examples, a coder may perform prediction operations using PU based on a size of PU. In some examples, a coder may signal a prediction mode for a PU. The prediction mode may identify a size and/or a type of prediction to be applied to the PU. For example, a prediction mode may indicate that a PU is intra-16×16, which may indicate that the PU is coded using intra-prediction (e.g., I-mode), and that the PU has a size of 16×16. As another example, a prediction mode may indicate that a PU is inter-8×8, which may indicate that the PU is coded using inter-prediction (e.g., P-mode or B-mode), and that the PU has a size of 8×8.

In some examples, a prediction mode as described above may be signaled using VLC techniques. For example, a particular prediction mode may be mapped to a code word based on a mapping table that defines a mapping between the prediction mode and the VLC code word. Such a mapping table may be constructed such that a most probable prediction mode is assigned a shortest VLC code word. Accordingly, an amount of data to communicate prediction modes for a plurality of blocks may be minimized.

In some examples, a mapping table that indicates a mapping between a VLC code word and a prediction mode for a CU (or one or more PU of a CU) may be adaptively generated. For example, as CU of a video frame are encoded, an encoder may adapt code words of one or more VLC tables representing prediction modes based on a frequency of occurrence of each prediction mode. For example, if a prediction mode is determined to occur more frequently than other prediction modes for previously coded CUs or blocks, that prediction mode may be assigned a shorter VLC code word than other prediction modes.

According to one aspect of this disclosure, for coding an inter-coded frame, e.g. a B or P frame, a coder may assign a dedicated code words to one or more intra-coded prediction modes in such a frame. According to this example, as CU of an inter-coded frame are coded, the coder may adaptively assign VLC code words that correspond to inter-coded or other prediction modes, but not to intra-coded prediction modes. According to these techniques, coding efficiency may be improved by reducing computational complexity.

Figure 6:
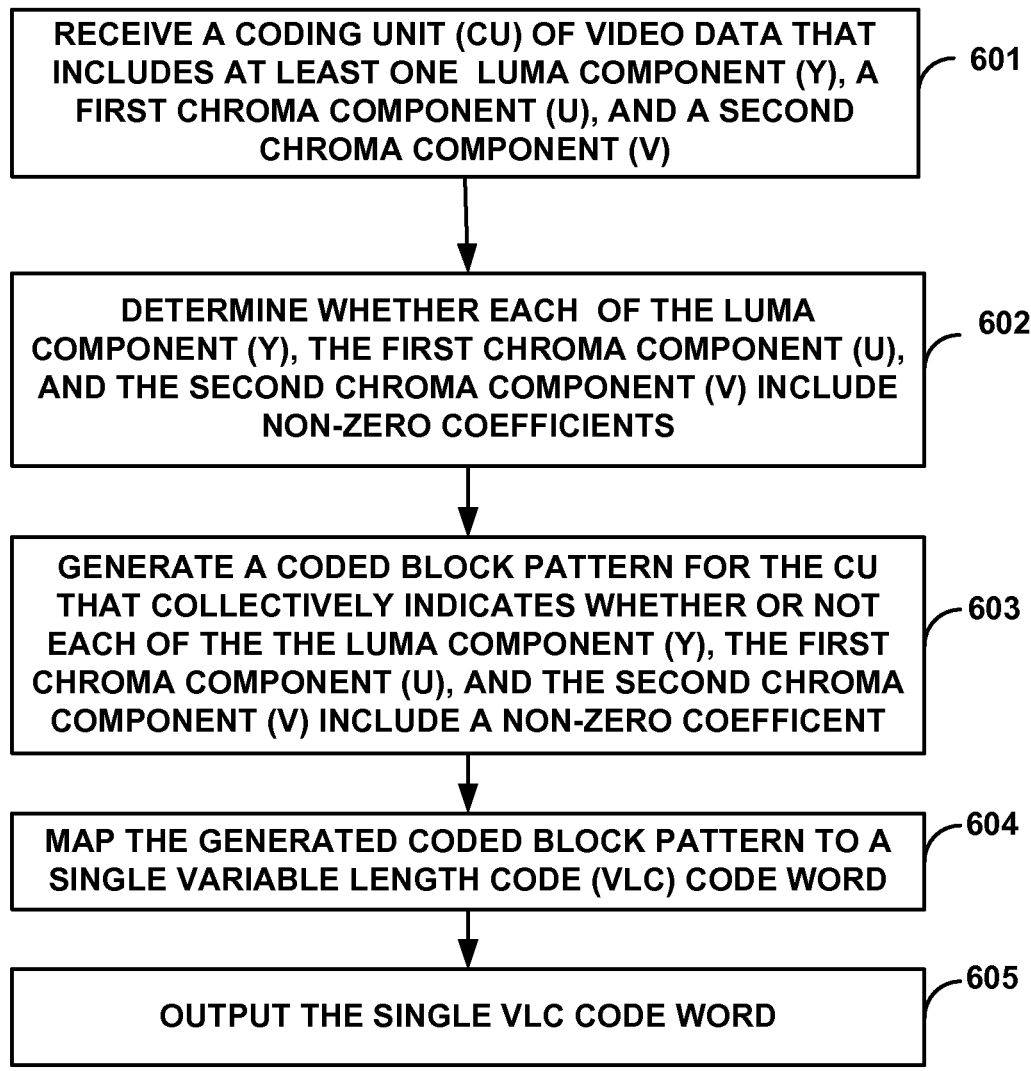
FIG. 6-11 are flow diagrams that illustrate various techniques of this disclosure.

FIG. 6 is a flow diagram that illustrates one example of a technique that may be performed by video encoder 200 consistent with the techniques of this disclosure. As shown in FIG. 6, video encoder 200 receives a coding unit (e.g., CU 401 illustrated in FIG. 4) of video data that includes a luma component (Y), a first chroma component (U), and a second chroma component (V) (601). Video encoder 200 (e.g., CBP encoding module 250) determines whether or not each of the luma component (Y), the first chroma component (U), and the second chroma component (V) includes a non-zero coefficient (602). Video encoder 200 (e.g., CBP encoding module 250) generates a coded block pattern (CBP) for the CU that collectively indicates whether or not each of the luma component (Y), the first chroma component (U), and the second chroma component (V) includes any non-zero coefficients independent of one another (603). Video encoder 200 (e.g., CBP encoding module 250) maps the generated CBP for the CU to a single variable length code (VLC) code word (604). Video encoder 200 (e.g., CBP encoding module 250) outputs the single VLC code word (605). The single VLC code word may identify to a decoder whether or not each of the luma component (Y), the first chroma component (U), and the second chroma component (V) includes any non-zero coefficients.

Figure 7:
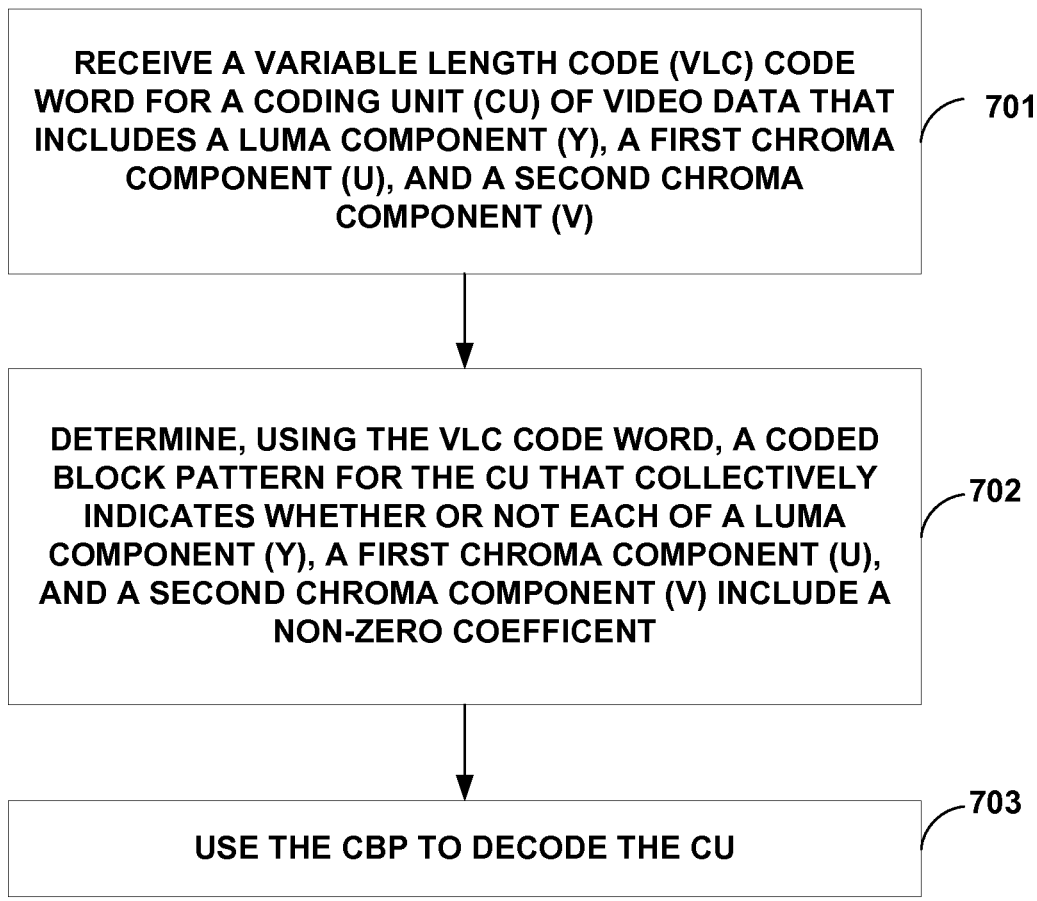

FIG. 7 is a flow diagram that illustrates one example of a technique that may be performed by video decoder 300 consistent with the techniques of this disclosure. As shown in FIG. 7, video decoder 300 (e.g., CBP decoding module 350) receives a variable length code (VLC) code word for a coding unit (CU) of video data that includes a luma component (Y), a first chroma component (U), and a second chroma component (V) (701). Video decoder 300 (e.g., CBP decoding module 350) determines, based on the VLC code word, a coded block pattern (CBP) for the CU (702). The CBP for the CU indicates individually whether or not each of the luma component (Y), the first chroma component (U), and the second chroma component (V) include a non-zero coefficient. Video decoder 300 decodes the CU based on the determined CBP (703). For example video decoder 300 may determine whether or not to decode transform coefficients of one or more of the luma component (Y), the first chroma component (U), and/or the second chroma component (V) based on a whether or not the CBP indicates that the respective component includes a non-zero coefficient.

Figure 8:
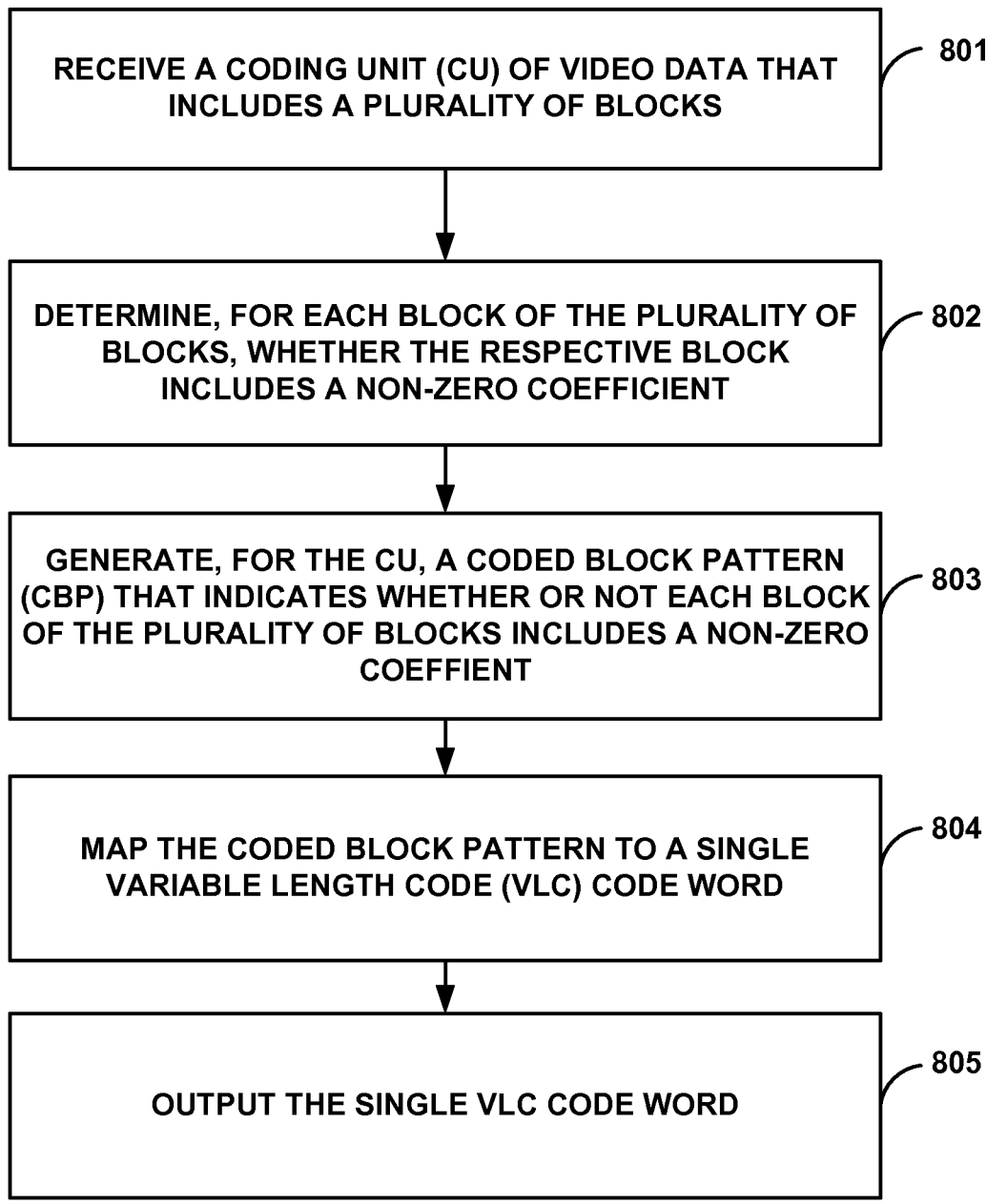

FIG. 8 is a flow diagram that illustrates one example of a technique that may be performed by video encoder 200 consistent with the techniques of this disclosure. As shown in FIG. 8, video encoder 200 receives a coding unit (e.g., CU 501 illustrated in FIGS. 4 and 5, respectively) of video data that includes a plurality of blocks (801). For example, the CU may be split into four equally sized blocks as depicted in FIG. 5. Video encoder 200 (e.g., CBP encoding module 250) determines, for each block of the plurality of blocks, whether the respective block includes a non-zero coefficient (802). Video encoder 200 (e.g., CBP encoding module 250) generates, for each video component of the CU, a coded block pattern (CBP) that indicates (e.g., via a plurality of CBF) for the video component whether or not each individual block of the plurality of blocks includes a non-zero coefficient (803). Video encoder 200 (e.g., CBP encoding module 250) maps the CBP to a single variable length code (VLC) code word (804). Video encoder 200 outputs the single VLC code word (805) for each video component. The single VLC code word may identify to a decoder for a video component of the CU whether or not each block of a plurality of blocks includes a non-zero coefficient.

Figure 9:
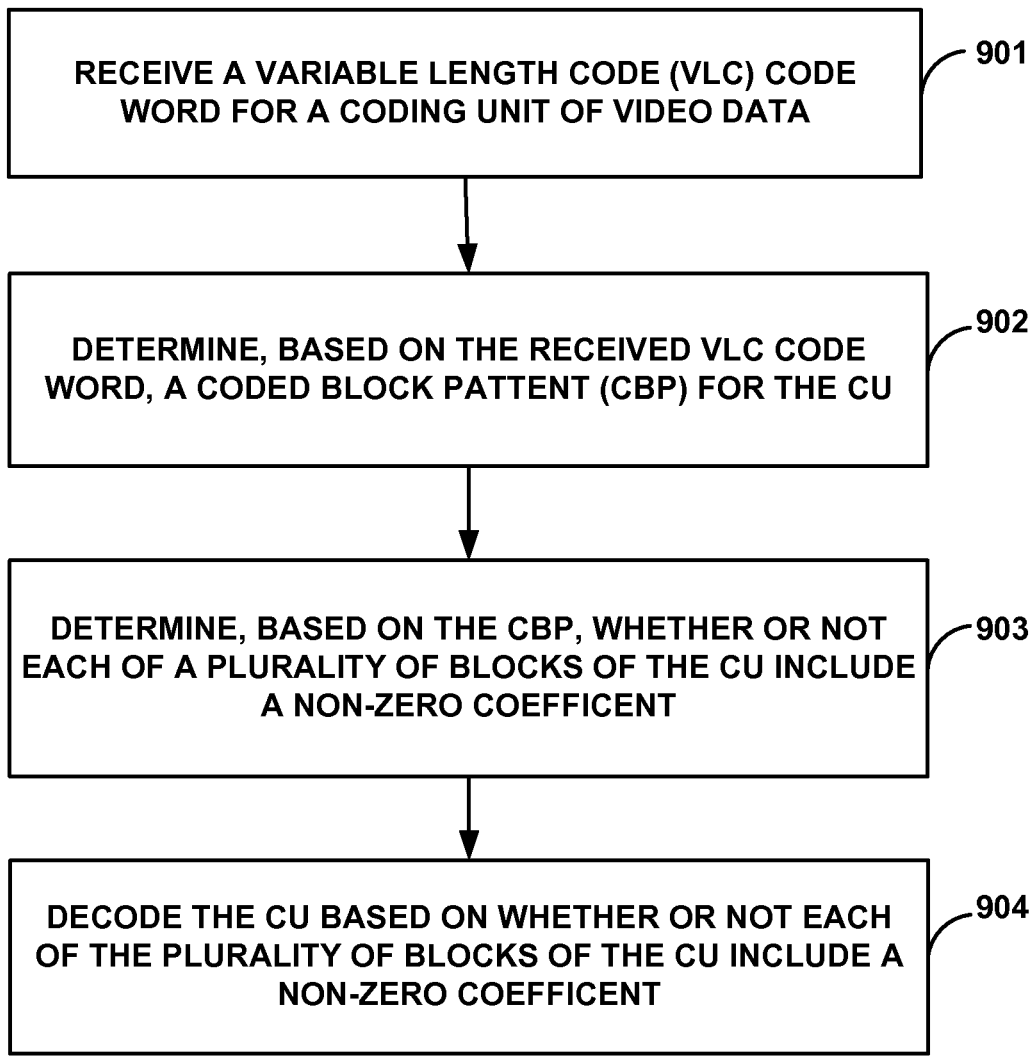

FIG. 9 is a flow diagram that illustrates one example of a technique that may be performed by video decoder 300 consistent with the techniques of this disclosure. As shown in FIG. 9, video decoder 300 (e.g., CBP decoding module 350) receives a variable length code (VLC) code word for a video component of a coding unit (CU) of video data that includes a plurality of blocks (901). Video decoder 300 (e.g., CBP decoding module 350) determines, based on the received VLC code word, a coded block pattern (CBP) for the video component of the CU (902). For example, video decoder 300 may access one or more VLC tables to map the VLC code word to the CBP for the CU. Video decoder 300 (e.g., CBP decoding module 350) determines, based on the CBP, whether or not each of a plurality of blocks of the video component of the CU include a non-zero coefficient (903). Video decoder 300 decodes the CU based on whether or not each of the plurality of blocks of the CU include a non-zero coefficient (904). For example, if a CBP for the CU indicates that a particular block of the plurality of blocks includes a non-zero coefficient, video decoder may decode the transform coefficient of the particular block. However, if the CBP indicates that the particular block does not include a non-zero coefficient, video decoder 300 may not decode the block.

Figure 10:
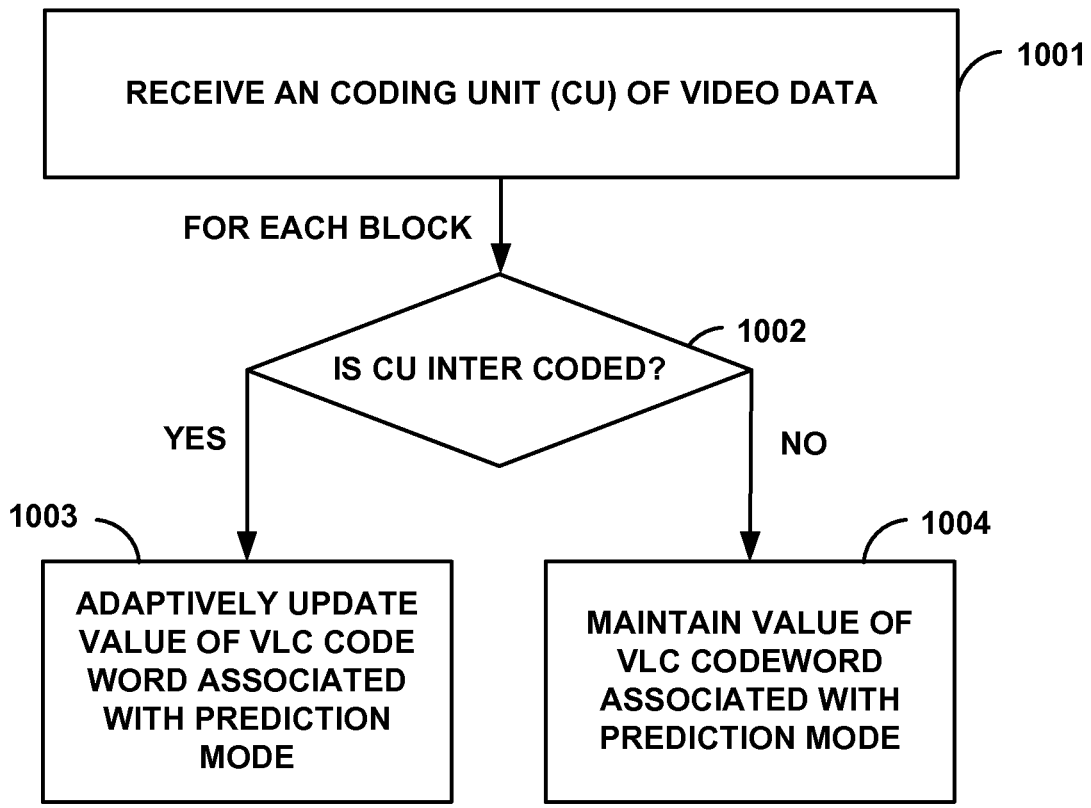

FIG. 10 is a flow diagram that illustrates one example of a technique that may be performed by video encoder 200 consistent with the techniques of this disclosure. As shown in FIG. 10, video encoder 200 receives a CU (e.g., CU 401, 501 illustrated in FIGS. 4 and 5, respectively) of video data (1001). According to the example of FIG. 10, video encoder 200 may or may not adaptively modify a VLC table based on a prediction mode of a CU being coded. For example, video encoder 200 may determine whether a prediction mode for a CU is an inter prediction mode (1002). If the prediction mode comprises an inter prediction mode, video encoder 200 may adaptively update a mapping between at least one VLC code word and at least one associated prediction mode values (1003). For example, video encoder 200 may modify a VLC code word that represents the prediction mode. As one example, video encoder 200 may use a VLC code word with a different bit length to represent a prediction mode of the CU.

If the CU does not include an inter prediction mode (e.g., intra prediction mode), video encoder 200 may use a dedicated code word in the same VLC table to represent the prediction mode (1004). For example, video decoder may not adaptively update a VLC code word associated with the prediction mode as depicted at 1003. Instead, video encoder 200 may assign and maintain a particular VLC code word (e.g., same bit length) in a VLC table to represent the prediction mode.

Figure 11:
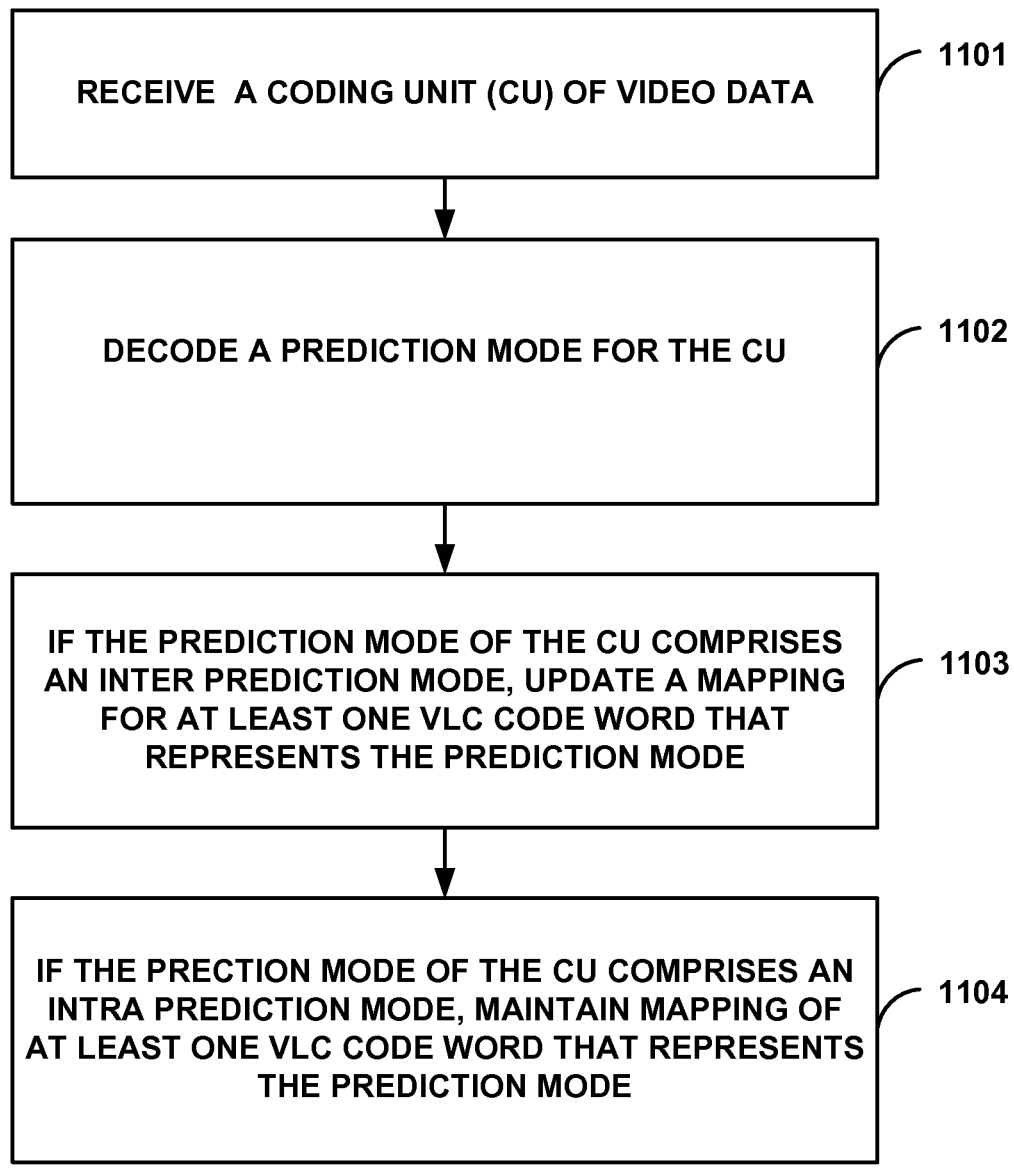

FIG. 11 is a flow diagram that illustrates one example of a technique that may be performed by video decoder 300 consistent with the techniques of this disclosure. As shown in FIG. 11, video decoder 300 receives a coding unit (CU) of video data (1101). Video decoder 300 decodes a prediction mode of the CU (1102). If the decoded prediction mode of the CU comprises an inter prediction mode, video decoder 300 updates a mapping for at least one VLC code word that represents the prediction mode (1103). However, if the decoded prediction mode of the CU comprises an intra prediction mode, video decoder 300 does not perform any update for the mapping of the VLC code word that represents the prediction mode (1104).

Figure 12A:
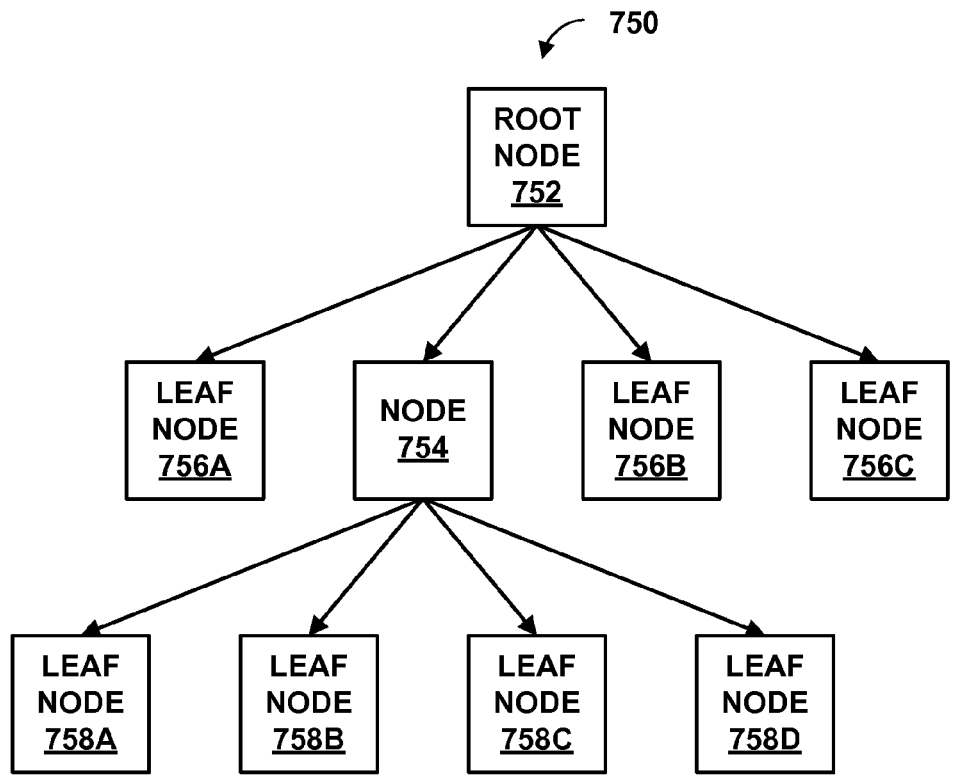
FIGS. 12A and 12B are conceptual diagrams that illustrate one example of a quadtree data structure consistent with the techniques of this disclosure.
Figure 12B:
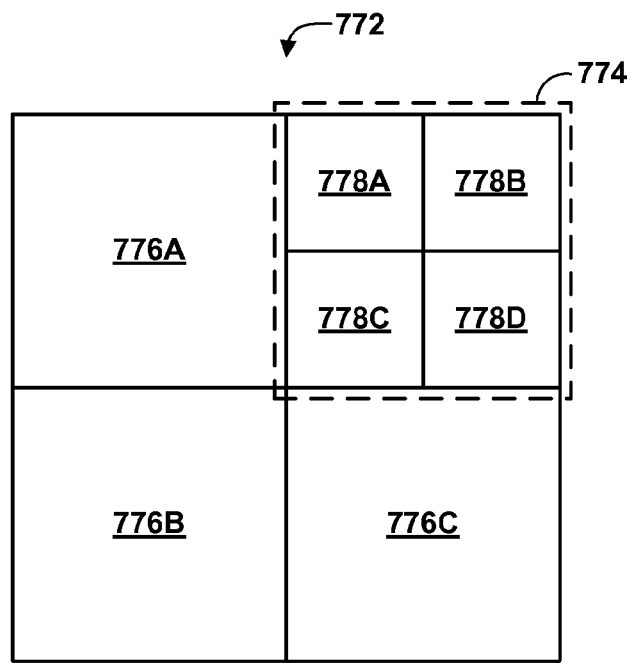

FIGS. 12A and 12B are conceptual diagrams illustrating an example quadtree 750 and a corresponding largest CU 772. FIG. 12A depicts an example quadtree 750, which includes nodes arranged in a hierarchical fashion. Each node in a quadtree, such as quadtree 750, may be a leaf node with no children, or have four child nodes. In the example of FIG. 12A, quadtree 750 includes root node 752. Root node 752 has four child nodes, including leaf nodes 756A-756C (leaf nodes 756) and node 754. Because node 754 is not a leaf node, node 754 includes four child nodes, which in this example, are leaf nodes 758A-758D (leaf nodes 758).

Quadtree 750 may include data describing characteristics of a corresponding largest CU (LCU), such as LCU 772 in this example. For example, quadtree 750, by its structure, may describe splitting of the LCU into sub-CUs. Assume that LCU 772 has a size of 2N×2N. LCU 772, as depicted in the example of FIG. 12B, has four sub-CUs 776A-776C (sub-CUs 776) and 774, each of size N×N. Sub-CU 774 is further split into four sub-CUs 778A-778D (sub-CUs 778), each of size N/2×N/2. The structure of quadtree 750 corresponds to the splitting of LCU 772, in this example. That is, root node 752 corresponds to LCU 772, leaf nodes 756 correspond to sub-CUs 776, node 754 corresponds to sub-CU 774, and leaf nodes 758 correspond to sub-CUs 778.

Data for nodes of quadtree 750 may describe whether the CU corresponding to the node is split. If the CU is split, four additional nodes may be present in quadtree 750. Nodes of the quadtree may include an indicator, such as a split_flag value, of whether the corresponding CU is split. The split_flag value may be a one-bit value representative of whether the CU corresponding to the current node is split. If the CU is not split, the split_flag value may be '0', while if the CU is split, the split_flag value may be '1'. With respect to the example of quadtree 750, an example of an array of split flag values is "1,0100,0000" going from root node to leaf node level by level.

As explained, various techniques of this disclosure may be performed by a video encoder or by a video decoder, which may comprise specific machines. The video encoders and decoders of this disclosure may be used or developed in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of decoding video data, comprising:
receiving a single variable length code (VLC) code word for a coded block pattern (CBP) of a coding unit (CU) of the video data that includes a luma component (Y), a first chroma component (U), and a second chroma component (V);
determining, based on the single VLC code word, the CBP for the CU, wherein the CBP indicates individually whether or not each of the luma component (Y), the first chroma component (U), and the second chroma component (V) includes a non-zero coefficient, and wherein determining the CBP for the CU comprises mapping the single VLC code word to the CBP using a VLC code table selected based on a context determined for the CU, the context selected from a group consisting of:
whether both of a first previously coded CU and a second previously coded CU do not include any non-zero coefficients,
whether one of the first previously coded CU or the second previously coded CU includes at least one non-zero coefficient, and another of the first previously coded CU or the second previously coded CU does not include at least one non-zero coefficient, and
whether both of the first previously coded CU and the second previously coded CU include at least one non-zero coefficient; and
using the determined CBP to decode the CU.

2. The method of claim 1, wherein each of the first previously coded CU and the second previously coded CU comprises a neighboring CU of the CU.

3. The method of claim 1, wherein receiving the single VLC code word comprises receiving the single VLC code word from an encoder.

4. The method of claim 1, further comprising:
determining a prediction mode for the CU;
if the determined prediction mode comprises an inter prediction mode, adaptively updating at least one VLC code word that represents the prediction mode; and if the determined prediction mode comprises an intra prediction mode, maintaining a dedicated VLC code word that represents the prediction mode.

5. The method of claim 1, further comprising, based on the CBP for the CU indicating that at least one of the luma component (Y), the first chroma component (U), or the second chroma component (V) includes a non-zero coefficient:
receiving a single VLC code word for a CBP of the respective component of the CU that includes a plurality of blocks;
determining, based on the single VLC code word, the CBP for the respective component;
determining, based on the CBP for the respective component, a coded block flag (CBF) for each of the plurality of blocks, wherein the CBF indicates whether or not the respective block of the plurality of blocks includes at least one non-zero coefficient; and
decoding the respective block based on the determined CBF.

6. An apparatus that decodes video data, the apparatus comprising:
a video decoder that receives a single variable length code (VLC) code word for a coded block pattern (CBP) of a coding unit(CU) of the video data that includes a luma component (Y), a first chroma component (U), and a second chroma component (V); and
a CBP decoding module that determines, based on the single VLC code word, the CBP for the CU, wherein the CBP indicates individually whether or not each of the luma component (Y), the first chroma component (U), and the second chroma component (V) includes a non-zero coefficient, and wherein CBP decoding module maps the single VLC code word to the CBP using a VLC code table selected based on a context determined for the CU, the context selected from a group consisting of:
whether both of a first previously coded CU and a second previously coded CU do not include any non-zero coefficients,
whether one of the first previously coded CU or the second previously coded CU includes at least one non-zero coefficient, and another of the first previously coded CU or the second previously coded CU does not include at least one non-zero coefficient, and
whether both of the first previously coded CU and the second previously coded CU include at least one non-zero coefficient, and
wherein the video decoder uses the determined CBP to decode the CU.

7. The apparatus of claim 6, wherein each of first previously coded CU and the second previously coded CU comprises a neighboring CU of the CU.

8. The apparatus of claim 6, wherein the video decoder receives the single VLC code word from an encoder.

9. The apparatus of claim 6, wherein the video decoder is further configured to:
determine a prediction mode for the CU;
if the determined prediction mode comprises an inter prediction mode, adaptively update at least one VLC code word that represents the prediction mode; and
if the determined prediction mode comprises an intra prediction mode, maintain a dedicated VLC code word that represents the prediction mode.

10. The apparatus of claim 6, wherein, based on the CBP for the CU indicating that at least one of the luma component (Y), the first chroma component (U), or the second chroma component (V) includes a non-zero coefficient:
the video decoder receives a single VLC code word for a CBP of the respective component of the CU that includes a plurality of blocks; and
the CBP decoding module determines, based on the single VLC code word, the CBP for the respective component, and determines, based on the CBP for the respective component, a coded block flag (CBF) for each of the plurality of blocks, wherein the CBF indicates whether or not the respective block of the plurality of blocks includes at least one non-zero coefficient, and wherein the video decoder decodes the respective block based on the determined CBF.

11. A device that decodes video data, the device comprising:
means for receiving a single variable length code (VLC) code word for a coded block pattern (CBP) of a coding unit (CU) of the video data that includes a luma component (Y), a first chroma component (U), and a second chroma component (V);
means for determining, based on the single VLC code word, the CBP for the CU, wherein the CBP indicates individually whether or not each of the luma component (Y), the first chroma component (U), and the second chroma component (V) includes a non-zero coefficient, and wherein the means for determining the CBP for the CU comprise means for mapping the single VLC code word to the CBP using a VLC code table selected based on a context determined for the CU, the context selected from a group consisting of:
whether both of a first previously coded CU and a second previously coded CU do not include any non-zero coefficients,
whether one of the first previously coded CU or the second previously coded CU includes at least one non-zero coefficient, and another of the first previously coded CU or the second previously coded CU does not include at least one non-zero coefficient, and
whether both of the first previously coded CU and the second previously coded CU include at least one non-zero coefficient; and
means for using the determined CBP to decode the CU.

12. The device of claim 11, wherein each of the first previously coded CU and the second previously coded CU comprises a neighboring CU of the CU.

13. The device of claim 11, wherein the means for receiving the single VLC code word receive the single VLC code word from an encoder.

14. The device of claim 11, wherein the video decoder is further configured to:
determine a prediction mode for the CU;
if the determined prediction mode comprises an inter prediction mode, adaptively update at least one VLC code word that represents the prediction mode; and
if the determined prediction mode comprises an intra prediction mode, maintain a dedicated VLC code word that represents the prediction mode.

15. A non-transitory computer-readable storage medium comprising instructions that upon execution in a processor, cause the processor to decode video data, wherein the instructions cause the processor to:
receive a single variable length code (VLC) code word for a coded block pattern (CBP) of a coding unit (CU) of the video data that includes a luma component (Y), a first chroma component (U), and a second chroma component (V);
determine, based on the single VLC code word, the CBP for the CU, wherein the CBP indicates individually whether or not each of the luma component (Y), the first chroma component (U), and the second chroma component (V) includes a non-zero coefficient, and wherein the instruction cause the processor to map the single VLC code word to the CBP using a VLC code table selected based on a context determined for the CU, the context selected from a group consisting of:
   whether both of a first previously coded CU and a second previously coded CU do not include any non-zero coefficients,
   whether one of the first previously coded CU or the second previously coded CU includes at least one non-zero coefficient, and another of the first previously coded CU or the second previously coded CU does not include at least one non-zero coefficient, and
   whether both of the first previously coded CU and the second previously coded CU include at least one non-zero coefficient; and
use the determined CBP to decode the CU.

16. The non-transitory computer-readable storage medium of claim 15, wherein each of the first previously coded CU and the second previously coded CU comprises a neighboring CU of the CU.

17. The non-transitory computer-readable storage medium of claim 15, wherein the instructions cause the processor to receive the single VLC code word from an encoder.

18. The non-transitory computer-readable storage medium of claim 15, wherein the instructions further cause the processor to:
   determine a prediction mode for the CU;
   if the determined prediction mode comprises an inter prediction mode, adaptively update at least one VLC code word that represents the prediction mode; and
   if the determined prediction mode comprises an intra prediction mode, maintain a dedicated VLC code word that represents the prediction mode.

* * * * *